(12) United States Patent
Porat

(10) Patent No.: US 9,923,999 B2
(45) Date of Patent: Mar. 20, 2018

(54) FRAME FORMATTING FOR COMMUNICATIONS WITHIN SINGLE USER, MULTIPLE USER, MULTIPLE ACCESS, AND/OR MIMO WIRELESS COMMUNICATIONS

(71) Applicant: BROADCOM CORPORATION, Irvine, CA (US)

(72) Inventor: Ron Porat, San Diego, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 77 days.

(21) Appl. No.: 14/927,813

(22) Filed: Oct. 30, 2015

(65) Prior Publication Data

US 2016/0112547 A1   Apr. 21, 2016

Related U.S. Application Data

(63) Continuation of application No. 13/861,792, filed on Apr. 12, 2013, now Pat. No. 9,178,968.

(60) Provisional application No. 61/639,050, filed on Apr. 26, 2012, provisional application No. 61/811,022, filed on Apr. 11, 2013.

(51) Int. Cl.
| | |
|---|---|
| *H04B 7/00* | (2006.01) |
| *H04L 29/06* | (2006.01) |
| *H04L 27/26* | (2006.01) |
| *H04L 5/00* | (2006.01) |
| *H04W 72/04* | (2009.01) |

(52) U.S. Cl.
CPC ............ *H04L 69/22* (2013.01); *H04L 5/0005* (2013.01); *H04L 27/263* (2013.01); *H04L 27/2613* (2013.01); *H04W 72/04* (2013.01)

(58) Field of Classification Search
CPC ...... H04W 76/02; H04W 76/04; H04W 88/02
USPC ............... 370/310, 328, 329, 431, 464, 465; 455/422, 450
See application file for complete search history.

(56) References Cited

U.S. PATENT DOCUMENTS

| | | | | |
|---|---|---|---|---|
| 8,867,653 | B2 * | 10/2014 | Zhang ................... | H04L 5/0048 375/259 |
| 8,867,675 | B1 * | 10/2014 | Zhang ................. | H04L 27/2657 375/259 |

(Continued)

*Primary Examiner* — Dmitry H Levitan
(74) *Attorney, Agent, or Firm* — Garlick & Markison; Shayne X. Short

(57) ABSTRACT

Frame formatting for communications within single user, multiple user, multiple access, and/or MIMO wireless communications. A signal is processed within a communication device using at least two respective downclocking ratios (e.g., a first downclocking ratio applied to a first portion of the signal such as a frame or packet extracted there from, a second downclocking ratio applied to a second portion of the signal). Alternatively, a signal is divided into more than two respective portions, and different respective downclocking ratios are applied to those different respective portions (e.g., a first downclocking ratio applied to a first portion of the signal, and so on up to an n-th downclocking ratio applied to an n-th portion of the signal). Some implementations apply a singular or common downclocking ratio to more than one portion of the signal (which may be contiguous/adjacent or non-contiguous/non-adjacent within the signal).

20 Claims, 16 Drawing Sheets

(56) References Cited

U.S. PATENT DOCUMENTS

| | | | |
|---|---|---|---|
| 8,923,282 B2 * | 12/2014 | Sampath | H04L 25/0232 370/328 |
| 8,948,283 B2 * | 2/2015 | Zhang | H04L 5/0048 375/260 |
| 9,178,968 B2 * | 11/2015 | Porat | H04L 27/2613 |
| 9,203,672 B2 * | 12/2015 | Porat | H04L 1/0059 |
| 9,203,673 B2 * | 12/2015 | Porat | H04L 1/0071 |
| 9,510,324 B2 * | 11/2016 | Lee | H04W 16/14 |

* cited by examiner

FRAME FORMATTING FOR COMMUNICATIONS WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

The present U.S. Utility patent application claims priority pursuant to 35 U.S.C. § 120 as a continuation of U.S. Utility application Ser. No. 13/861,792, entitled "Frame formatting for communications within single user, multiple user, multiple access, and/or MIMO wireless communications," filed Apr. 12, 2013, pending, and scheduled subsequently to be issued as U.S. Pat. No. 9,178,968 on Nov. 3, 2015 (as indicated in an ISSUE NOTIFICATION mailed from the USPTO on Oct. 14, 2015), which claims priority pursuant to 35 U.S.C. § 119(e) to U.S. Provisional Application No. 61/639,050, entitled "Frame formatting for communications within single user, multiple user, multiple access, and/or MIMO wireless communications," filed Apr. 26, 2012; and U.S. Provisional Application No. 61/811,022, entitled "Frame formatting for communications within single user, multiple user, multiple access, and/or MIMO wireless communications," filed Apr. 11, 2013, all of which are hereby incorporated herein by reference in their entirety and made part of the present U.S. Utility Patent application for all purposes.

BACKGROUND OF THE INVENTION

Technical Field of the Invention

The invention relates generally to communications; and, more particularly, it relates to frame formatting within single user, multiple user, multiple access, and/or MIMO wireless communications.

Description of Related Art

Communication systems support wireless and wire lined communications between wireless and/or wire lined communication devices, range from national and/or international cellular telephone systems to the Internet to point-to-point in-home wireless networks, and operate in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), etc., and/or variations thereof In some instances, wireless communication between a transmitter (TX) and receiver (RX) is a single-output-single-input (SISO) communication. Other types of wireless communications include single-input-multiple-output (SIMO) (e.g., a single TX processes data into RF signals that are transmitted to a RX that includes two or more antennae and two or more RX paths), multiple-input-single-output (MISO)(e.g., a TX includes two or more transmission paths (e.g., digital to analog converter, filters, up-conversion module, and a power amplifier) that each converts a corresponding portion of baseband signals into RF signals, which are transmitted via corresponding antennae to a RX), and multiple-input-multiple-output (MIMO)(e.g., a TX and RX each include multiple paths such that a TX parallel processes data using a spatial and time encoding function to produce two or more streams of data and a RX receives the multiple RF signals via multiple RX paths that recapture the streams of data utilizing a spatial and time decoding function).

DETAILED DESCRIPTION OF THE INVENTION

Figure 1:
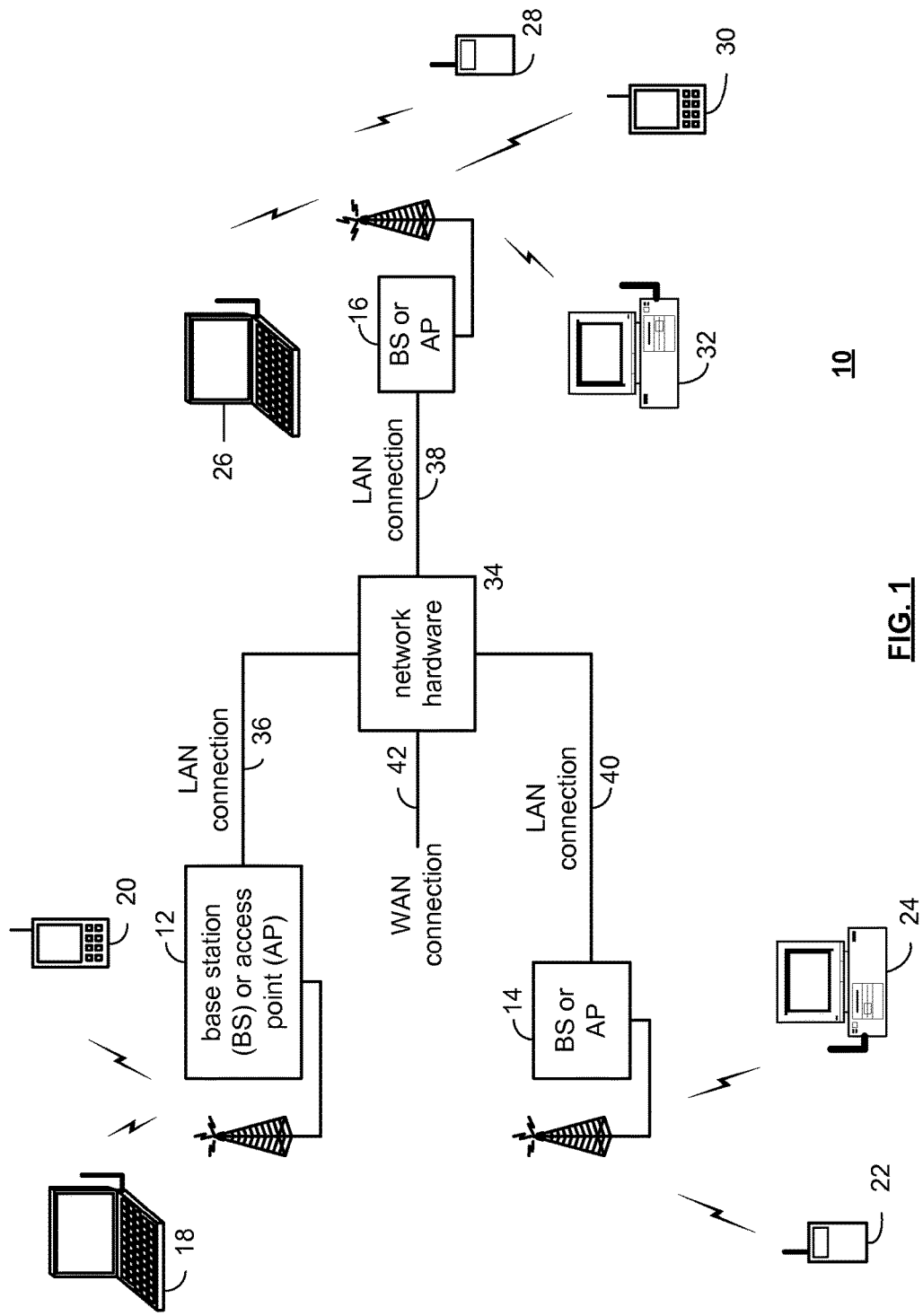
FIG. 1 is a diagram illustrating an embodiment of a wireless communication system.

FIG. 1 is a diagram illustrating an embodiment of a wireless communication system 10 that includes base stations and/or access points 12-16, wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Figure 2:
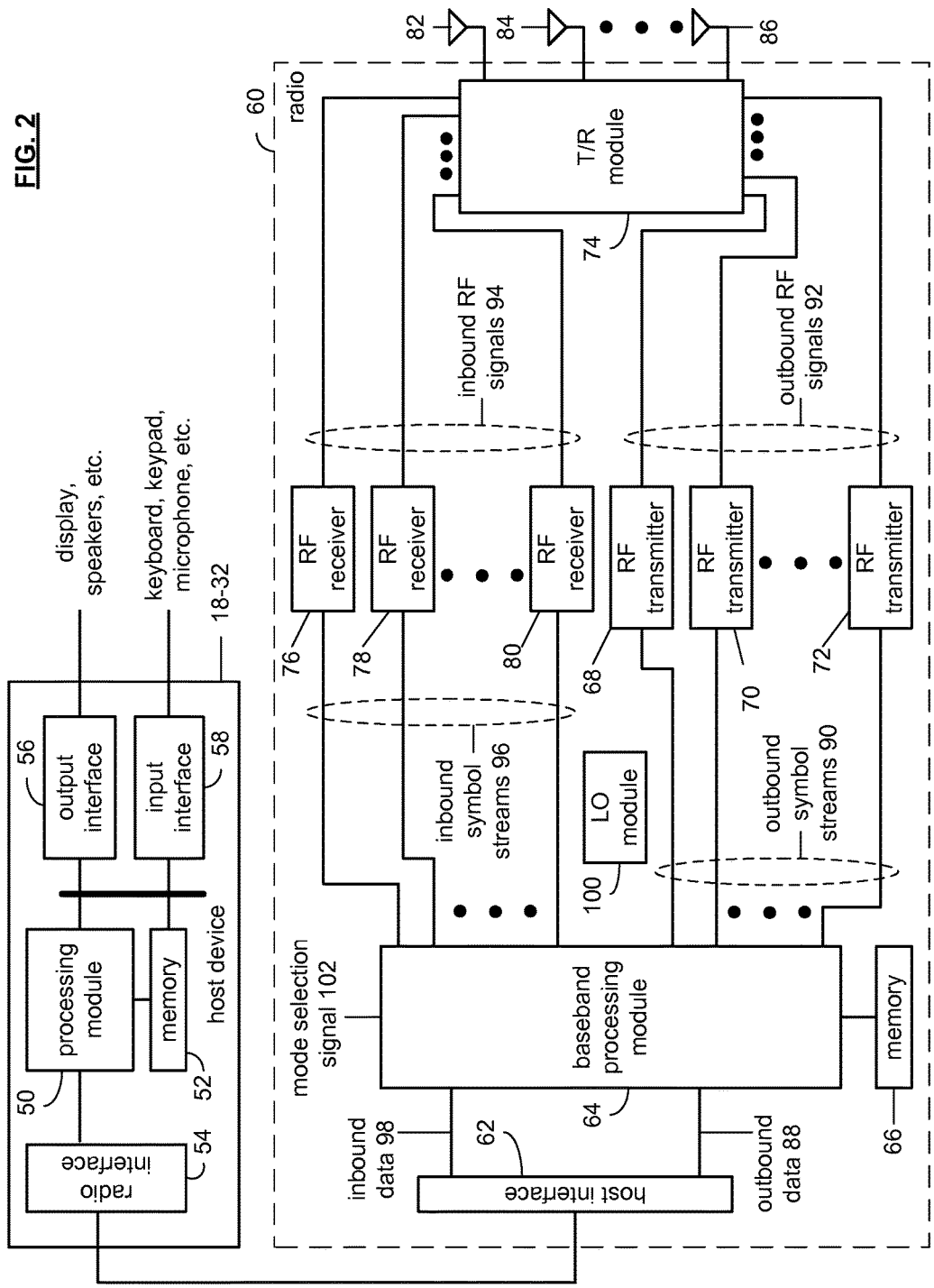
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure. Host device 18-32 includes a processing module 50, memory 52, radio interface 54, input interface 58 and output interface 56. Processing module 50 and memory 52 execute corresponding instructions typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself.

Radio 60 includes a host interface 62, a baseband processing module 64, memory 66, radio frequency (RF) transmitters 68-72, a transmit/receive (T/R) module 74, antennae 82-86, RF receivers 76-80, and a local oscillation module 100. The baseband processing module 64, in combination with operational instructions stored in memory 66, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables as may be understood by the reader. For example, the mode selection signal 102 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. Also, in such mode selection tables, a code rate is supplied as well as number of coded bits per subcarrier (NBPSC), coded bits per OFDM symbol (NCBPS), data bits per OFDM symbol (NDBPS). The mode selection signal may also indicate a particular channelization for the corresponding mode which for the information in one of the mode selection tables with reference to another of the mode selection tables. It is of course noted that other types of channels, having different bandwidths, may be employed in other embodiments without departing from the scope and spirit of the invention.

The baseband processing module 64, based on the mode selection signal 102 produces the one or more outbound symbol streams 90 from the output data 88. For example, if the mode selection signal 102 indicates that a single transmit antenna is being utilized for the particular mode that has been selected, the baseband processing module 64 will produce a single outbound symbol stream 90. Alternatively, if the mode selection signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80 converts the inbound RF signals 94 into a corresponding number of inbound symbol streams 96. The number of inbound symbol streams 96 will correspond to the particular mode in which the data was received. The baseband processing module 64 receives the inbound symbol streams 96 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into radio frequency (RF) signals in accordance with one of the operating modes of the WLAN protocol, wherein the operating modes includes multiple input and multiple output combinations.

An embodiment of the Physical Medium Dependent (PMD) module includes an error protection module, a demultiplexing module, and direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into error protected data streams The direct conversion modules are operably coupled to convert the error protected data streams into radio frequency (RF) signals.

As one of average skill in the art will appreciate, the wireless communication device of FIG. 2 may be implemented using one or more integrated circuits in accordance with any desired configuration or combination or components, modules, etc. within one or more integrated circuits.

Figure 3:
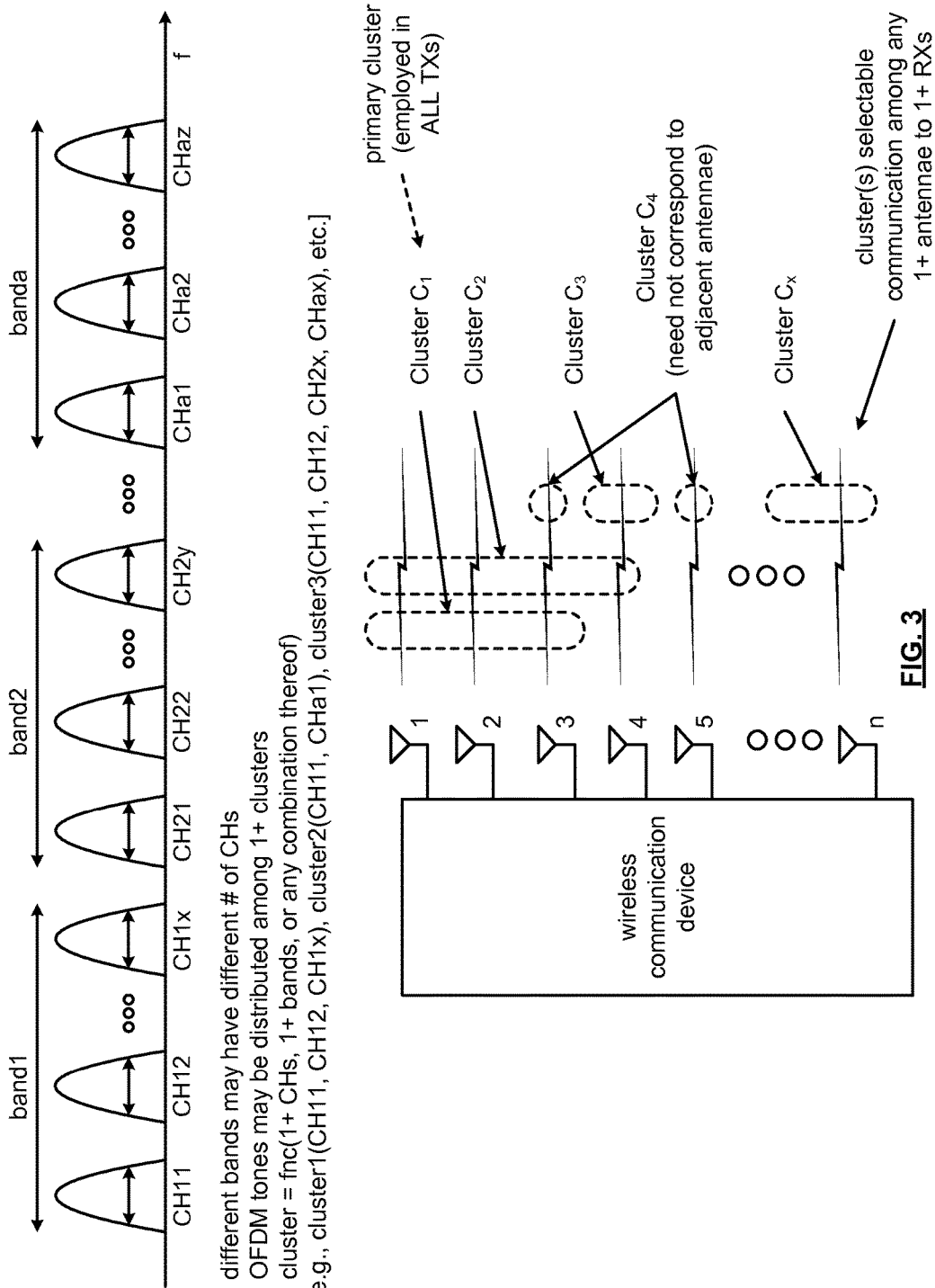
FIG. 3 is a diagram illustrating an embodiment of a wireless communication device, and clusters, as may be employed for supporting communications with at least one additional wireless communication device.

FIG. 3 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination of one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices. Such clusters may be used for transmissions of signals via various one or more selected antennae. For example, different clusters are shown as being used to transmit signals respectively using different one or more antennae.

Also, it is noted that, all such wireless communication devices within such a communication system may of course support bi-directional communications to and from other wireless communication devices within the communication system. In other words, the various types of transmitting wireless communication device(s) and receiving wireless communication device(s) may also support bi-directional communications to and from other wireless communication devices within the communication system. Generally speaking, such capability, functionality, operations, etc. as described herein may be applied to any wireless communication device.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ad, ae, af, ah, etc.).

Figure 4:
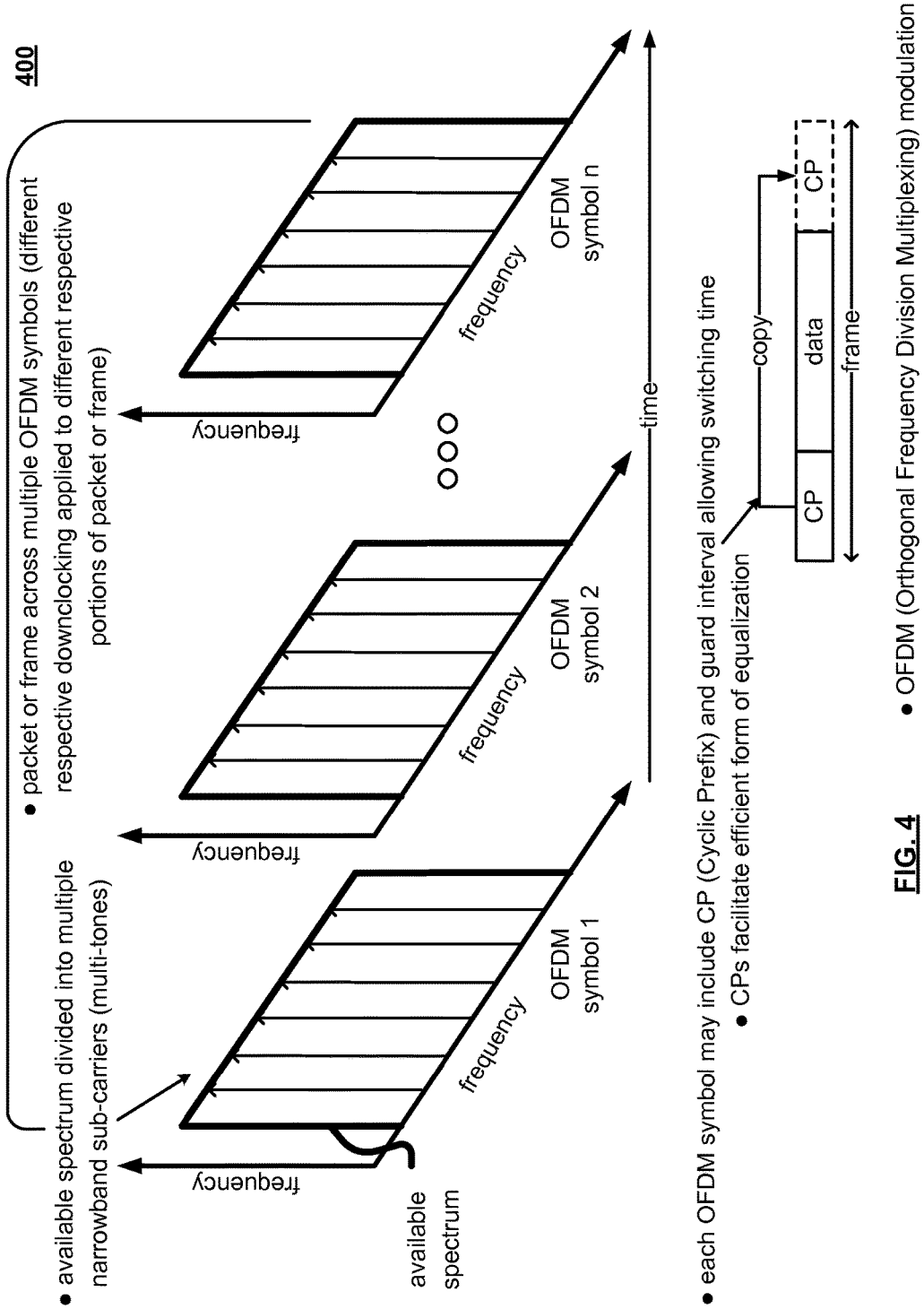
FIG. 4 illustrates an embodiment of OFDM (Orthogonal Frequency Division Multiplexing).

FIG. 4 illustrates an embodiment 400 of OFDM (Orthogonal Frequency Division Multiplexing). OFDM modulation may be viewed as dividing up an available spectrum into narrowband sub-carriers (e.g., lower data rate carriers). Typically, the frequency responses of these sub-carriers are overlapping and orthogonal. Each sub-carrier may be modulated using any of a variety of modulation coding techniques. A given frame or packet may be distributed across more than one OFDM symbol, and different respective downclocking ratios may be applied to different respective portions of the frame or packet.

Figure 5:
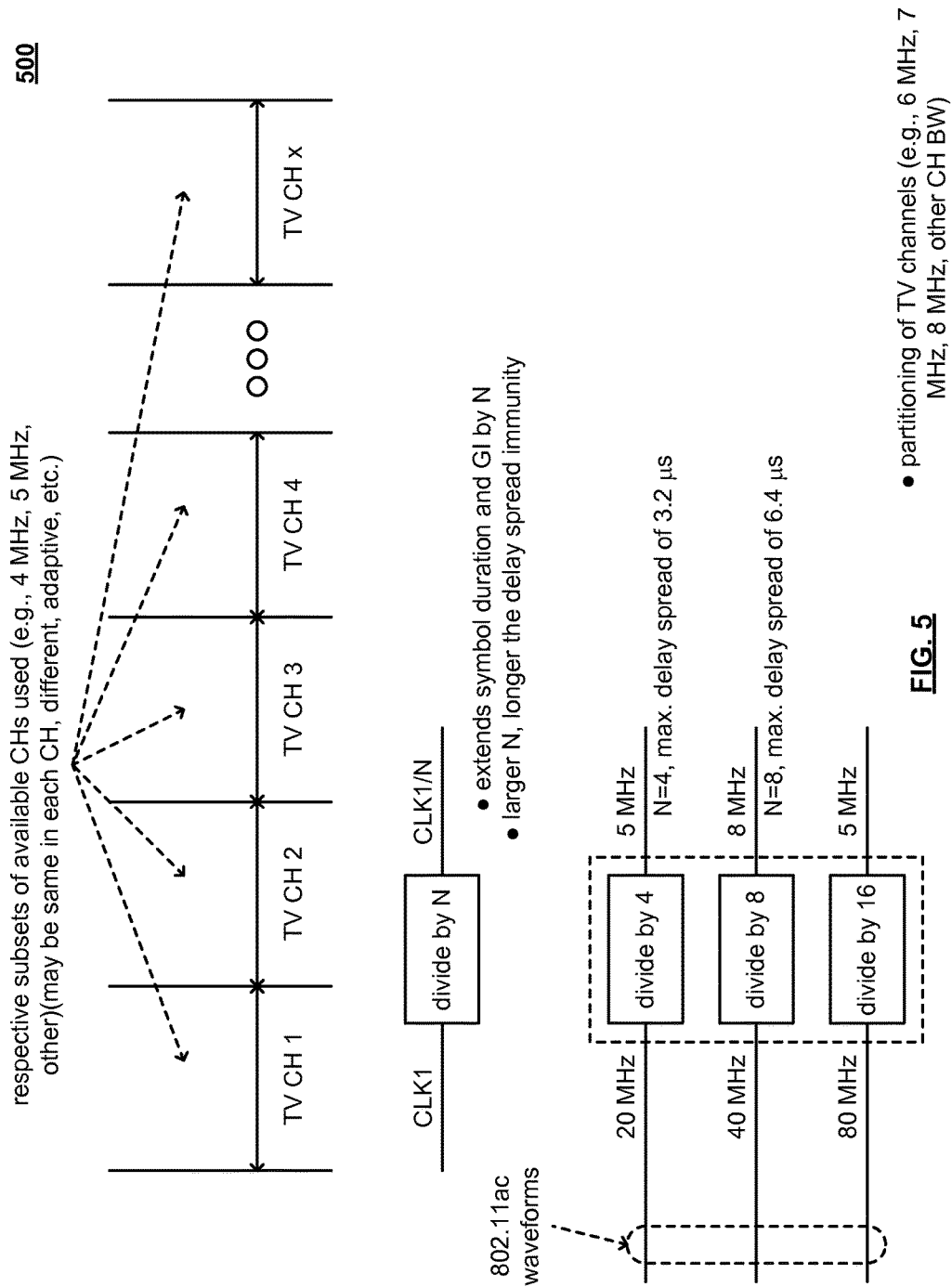
FIG. 5 illustrates an embodiment of partitioning of television (TV) channels.

FIG. 5 illustrates an embodiment 500 of partitioning of television (TV) channels. Certain wireless communication devices may be implemented to operate within frequency spectra typically dedicated for use by television channels. For example, TV channels operating in accordance with broadcast television may operate using particular portions of the electromagnetic frequency spectrum. Generally, frequencies associated with UHF and VHF may be employed for broadcast television. However, certain wireless communication devices have capability to operate using some or all of these portions of the frequency spectrum when some or all of these portions of the frequency spectrum are not used for television. For example, selective operation of a wireless communication device may be made based upon whether or not some or all of the portions of the frequency spectrum typically used for broadcast television are in use or not. Generally, portions of the frequency spectrum typically dedicated for such use (e.g., broadcast television) may instead be used for operating wireless communication devices such as in accordance with those operative within wireless local area network (WLAN/WiFi) or other wireless communication systems, networks, etc.

In accordance with providing operation of such wireless communication devices using frequency spectra typically associated with TV channels, care must be made to ensure that operation of such wireless communication devices is on a non-interfering basis with respect to any broadcast TV. For example, while any broadcast TV existent and such portions of the frequency spectrum are given primary or first priority, secondary or second priority may be given for use of such wireless communication device is provided that they can operate on a non-interfering basis with respect to broadcast TV.

In accordance with current rules and guidelines including those provided by the Federal Communications Commission (FCC), there are very strict guidelines by which such wireless communication device operation may be made using those portions of the frequency spectra typically associated with TV channels. For example, based upon operation in accordance with one or more broadcast television channels, a very low spectral mask requirement (e.g., −55 dB attenuation) is required at the respective edge of a 6 MHz channel (e.g., the respective lower and upper frequency band edge boundaries are typically separated by approximately 6 MHz in accordance with TV channels [at least in the United States], such as over the air broadcast channel 2 has a lower edge of 54 MHz and an upper edge of 60 MHz, over the air broadcast channel 3 has a lower edge of 60 MHz and upper edge of 66 MHz, etc. in accordance with VHF low band (band I)).

Typically, operation in accordance with IEEE 802.11x (e.g., where x is a, b, g, n, ac, ad, ae, af, ah, etc.) channels requires that a wireless communication device provide for significantly less attenuation than is required to operate using frequency spectra typically associated with TV channels. Among others, IEEE 802.11af is a developing standard, protocol, and/or recommended practice directed towards operation of one or more wireless local area networks (WLAN/WiFi) on a secondary, non-interfering basis with respect to broadcast television channels. Generally speaking, broadcast television channels around the world use respective channel bandwidths of particular widths. Considering the United States and some other countries, respective channel bandwidths of 6 MHz are employed. Considering Australia and some other countries, respective channel bandwidths of 7 MHz are employed. Considering various countries in Europe, among others, respective channel bandwidths of 8 MHz are employed. Regardless of the particular channel bandwidth employed in a given application, operation of one or more wireless local area networks (WLAN/WiFi) on a secondary, non-interfering basis may be supported. It is further noted that while certain of the various embodiments and/or diagrams presented herein are directed towards channel bandwidths particularly of 6 MHz, it is noted that any one or more of the various aspects, embodiments, and/or their equivalents, of the invention may generally be adapted and applied towards channel bandwidths of different respective values (e.g., 7 MHz, 8 MHz, and/or any other particular channel bandwidths). That is to say, while certain of the various embodiments and/or diagrams herein are directed towards a preferred an exemplary embodiment of 6 MHz channels, any such aspects, embodiments, and/or their equivalents, of the invention may be applied to any other desired channel bandwidth without departing from the scope and spirit of the invention.

For example, operation of a wireless communication device in accordance with IEEE 802.11x channels may be acceptable while providing an attenuation of approximately −10 dB at the edge of IEEE 802.11x channels. As may be understood, there is a significant spectral mask requirement for operation using frequency spectra typically associate with TV channels (e.g., −55 dB attenuation) in comparison to that which is required in accordance with typical operation in accordance with IEEE 802.11x channels (e.g., −10 dB attenuation). Also, for operation using frequency spectra typically associate with TV channels, there is a power spectral density (PSD) limit on the amount of transmit power that may be used in any given portion of bandwidth (e.g., a PSD limit in any given 100 kHz of bandwidth).

In one possible embodiment, clocking ratio of a desired ratio (e.g., generally, N) is operative to generate any one of a number of different respective channels. For example, considering a 20 MHz channel, down clocking by a value of four would provide for 5 MHz channels which would fit within the specified 6 MHz bandwidth channels of the frequency spectra typically associated with TV channels. Alternatively, considering a 20 MHz channel, down clocking by a value of five would provide for 4 MHz channels which would also fit within the specified 6 MHz bandwidth channels of the frequency spectra typically associated with TV channels. As may be understood, different respective ratios down clocking may be employed for providing for different respective widths of channels which may be particularly designed to fit within the specified 6 MHz bandwidth channels of the frequency spectra typically associated with TV channels. In some embodiments, having relatively narrower channels (e.g., 4 MHz channels in comparison to 5 MHz channels) may be desirable in order to provide for the very low spectral mask requirements needed at the respective edges of a given 6 MHz channel existent within the frequency spectra typically associated with TV channels. Generally speaking, a divide by N processing circuitry, module, functional block, etc. may be implemented to perform such down clocking of a given signal (e.g., such as one having a frequency of 20 MHz, or some other frequency) thereby generating at least one down clocked signal generally having a frequency of 20/N MHz (e.g., or generally some frequency such as M/N MHz, in accordance with performing down clocking of a signal having a frequency of M MHz by a value of N). Such a down clocking value may be programmable and/or selectable as may be desired in different respective embodiments. For example, in certain situations, a wireless communication device may be adaptive in order to select anyone of a number of different respective bandwidth channels based on any of a number of considerations. For example, in one instance, 2 MHz bandwidth channels may be preferable; in another instance, 3 MHz bandwidth channels may be desirable; and yet another instance, 5 MHz channels may be acceptable. Generally, appropriate down clocking of a signal may provide for a signal that can have properties acceptable for use within the specified 6 MHz bandwidth channels of the frequency spectra typically associated with TV channels.

In addition, it is noted that adaptation with respect to the amount of bandwidth with in a given channel may be performed. For example, considering a channel bandwidth of a particular width (e.g., 6 MHz), some embodiments may operate by employing a particular amount of bandwidth (e.g., 4 MHz, 5 MHz, etc.) of bandwidth within that given available channel bandwidth (e.g., 6 MHz). Depending upon any of a number of considerations (e.g., spectral mask requirements, attenuation and/or filtering capabilities, operating conditions, changes in operating conditions, environmental considerations, etc.), the particular amount of bandwidth employed within an available channel bandwidth may be modified and/or adapted over time. For example, a first amount of bandwidth within the available channel may be employed at or during a first time, a second amount of bandwidth within the available channel may be employed at ordering a second time, etc. and so on.

In certain embodiments, appropriate dividing down of a signal into respective channels of specified sizes may provide for co-opting the PHY definitions of IEEE 802.11ac (64/128/256/512 size fast Fourier transform (FFT)). For example, as may be seen in the diagram, a first clock having a first frequency (e.g., CLK1) may be divided down by a factor of N to generate a second having a second frequency (e.g., CLK1/N). Generally, a first clock signal having a first frequency (or set of clock signals each having a respective and different first frequency) may be divided down by a factor of N to generate a second clock signal having a second frequency (or a set of clock signals each having a respective and different second frequency).

For example, in one particular embodiment, a first clock has a frequency of 20 MHz and may be divided down by a factor of N (where N may be programmable and/or selectable certain embodiments) to generate a second clock signal having a divided down frequency of 20/N MHz. The different respective first and second clocks may be implemented and operative for use (e.g., such as by the PHY) of a first and second one or more transceiver modules/circuitries within the wireless communication device. For example, the first clock having a frequency of 20 MHz may be employed by a first one or more transceiver modules/circuitries within the wireless communication device, and a second clock having a frequency of 20/N MHz may be employed by a second one or more transceiver modules/circuitries within the wireless communication device.

Each of the respective clocks within the various sets may be selectively provided to different portions of the first/second one or more transceiver modules/circuitries. That is to say, within the first/second clocks, the different clocks therein may be provided to different respective portions of the first/second one or more transceiver module/circuitry (e.g., 20 MHz to a first portion, 20/N MHz to a second portion, etc.). It is of course noted that such respective transceiver modules/circuitries may respectively be implemented as having different respective transmitter and receiver components. In some embodiments, a given communication device may include a singular set of transceiver modules/circuitries, and depending upon the frequency of the clock signal provided thereto, signaling would be generated in accordance with one of any of a number of respective communication protocols, standards, and/or recommended practices. That is to say, when a first clock frequency is employed, signaling may be generated in accordance with a first communication protocol, standard, and/or recommended practice. Then, if a second clock frequency is employed (e.g., such as a down clocked version of the first clock frequency), then signaling may be generated in accordance with a second communication protocol, standard, and/or recommended practice.

Depending upon any one or more of a number of considerations (e.g., current operating conditions, currently existent broadcast TV within one or more of the TV channels, interference, noise, environmental conditions, etc.), one particular frequency of channels may be desirable over one or more other frequencies. Also, depending upon any one or more of such considerations, including those described above, as well as the very stringent spectral mask requirements when operating using portions of the frequency spectra typically associated with TV channels may direct the selection of one particular frequency over others. For example, in certain situations, 4 MHz channels may be suitable and acceptable for effectuating be very stringent required spectral mask at the respective bandages of a 6 MHz channel within the frequency spectra typically associated with TV channels (e.g., a −55 dB attenuation may be able to be achieved at the 6 MHz band edges using 4 MHz channels). In another situation, 5 MHz channels may be suitable and acceptable for effectuating be very stringent required spectral mask at the respective bandages of a 6 MHz channel within the frequency spectra typically associated with TV channels (e.g., a −55 dB attenuation may be able to be achieved at the 6 MHz band edges using 4 MHz channels). However, there may be some situations in which either the design and/or implementation of a given wireless communication device, or the current operating conditions, would require that channels of relatively narrower with be employed. For example, in some situations, relatively narrow channels, such as 2 MHz channels may be the widest channels that may be used while providing for suitable and acceptable operation including complying with the very stringent required spectral mask at the respective bandages of a 6 MHz channel within the frequency spectra typically associated with TV channels (e.g., a −55 dB attenuation may be able to be achieved at the 6 MHz band edges using 4 MHz channels).

As may be understood, when different respective widths are employed using different respective channels, particularly using operation in accordance with OFDM, certain operational modes may provide for different respective numbers of tones and/or sub-carriers to be used. For example, such as with reference to FIG. 4, if the portion of the frequency spectrum employed in accordance with an OFDM symbol is changed, so will the possible and/or available number of tones and/or sub-carriers change.

In one embodiment, in order to provide for an instance in which relatively larger percentages of a 6 MHz TV channel may be used (e.g., comparing and implementation using 5 MHz channels as opposed to 4 MHz channels), additional data sub-carriers may be employed within an alternative operational mode.

As may be understood with respect to operating with available TV channels, and for a given signal bandwidth [e.g., such as within a 6 MHz or 8 MHz TVWS (television (TV) white space) channel], more than one possible down-clocking ratio may be employed to arrive at a desired signal bandwidth. For example, with respect to down-clocking and IEEE 802.11ac waveform, one or more respective down-clocking ratios may be employed to arrive at one or more desired signal bandwidth. For example, considering that a 5 MHz bandwidth of an available TV channel (e.g., 5 MHz of the available 6 MHz in one instance), a down-clocking ratio of 4 may be made using the 20 MHz IEEE 802.11ac waveform. Analogously, a down-clocking ratio of 16 may be employed when using the 80 MHz IEEE 802.11 ac waveform.

Generally speaking, down-clocking may be made to assist in generating the signal waveforms (e.g., the physical layer (PHY) waveforms) to fit within the usable available frequency spectrum (e.g., such as a subset of the available bandwidth within a 6 MHz or 8 MHz channel). More than one respective down-clocking ratio may be employed (e.g., such as using down-clocking ratios of 4 and 8), but generally speaking, any desired number of down-clocking ratios may be employed having any particular desired values.

Down-clocking by a factor of N extends the symbol duration than the guard interval (GI) by that same factor N, and the larger that N is, then the longer the delay spread immunity will correspondingly be. In certain preferred embodiments, an appropriate TVWS design will effectuate the support of the delay spread of up to several microseconds. For example, with N=4, the maximum delay spread that can be supported is 3.2 µs, and with N=8, the maximum delay spread that can be supported is 6.4 µs. In one desired embodiment, a preference may be made for N=8. In certain implementations, a N higher than that is not necessarily needed as associated benefits there with may be relatively less than an increase in complexity of an overdesigned system.

However, it is noted that the media access control (MAC) throughput of a communication system is typically reduced with an increase in the value of N, since the preamble length increases (e.g., in terms of absolute microseconds), and correspondingly so do the MAC parameters such as short interframe space (SIFS) and slot time (SLOT). Herein, various enhancements are presented to improve the overall system efficiency using a desired down-clocking ratio (e.g., N=8) of a particular size fast Fourier transform (FFT) waveform (e.g., a 128 FFT waveform and some instances).

Figure 6:
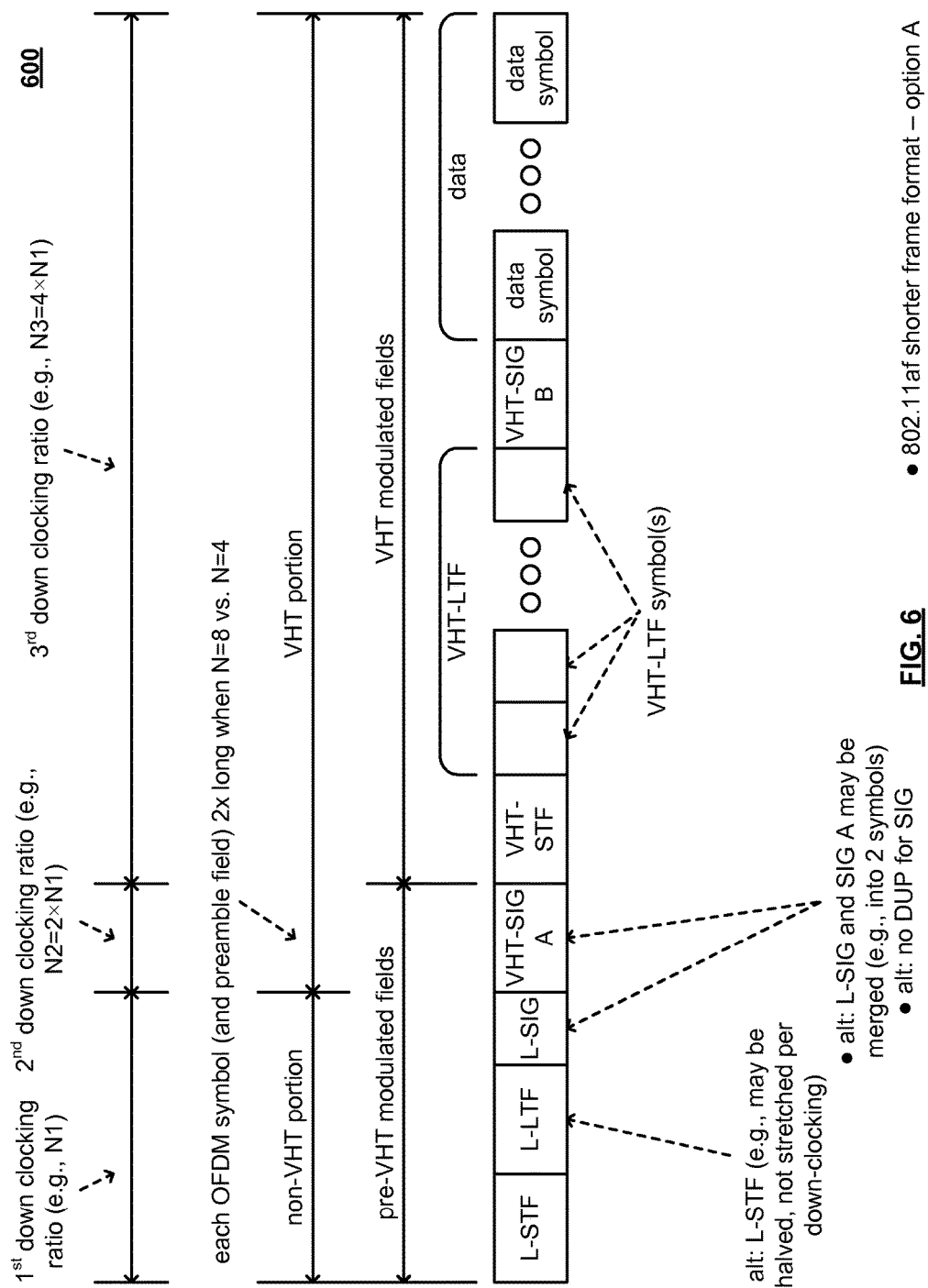
FIG. 6 illustrates an embodiment of a shorter frame format option (e.g., frame format—option A).

FIG. 6 illustrates an embodiment 600 of a shorter frame format option (e.g., frame format —option A). From certain perspectives, a frame format corresponding to that analogous to IEEE 802.11ac may be viewed as a baseline frame format, after undergoing modification in certain situations, for generating a frame format corresponding to the developing IEEE 802.11af.

It is noted that each OFDM symbol, and hence each respective preamble field shown (e.g., L-STF, L-LTF, L-SIG, VHT-SIG A, etc.), will correspondingly be lengthened when using a down-clocking ratio having a higher value. For example, each respective OFDM symbol, and hence each respective preamble field would be twice as long when using a down-clocking ratio N =8 compared with using a down-clocking ratio N=4. It is noted that certain improvements may be made to a given frame format using a down-clocking ratio of N=8 (e.g., down-clocking by a factor of eight of the 128 FFT waveform) to get to a signal corresponding to a 5 MHz channel (e.g., which will reside within an available TV channel).

With respect to the L-STF field, this respective field within the preamble is used to acquire the packet and requires a certain length irrespective of the OFDM symbol length. That is to say, this particular field is typically a timing acquisition, packet detection, etc. In some embodiments, the length of this respective field may be reduced by half (e.g., halved) by either employing a fewer number (e.g., 5) of repetitions instead of the typical number of repetitions (e.g., 10). When comparing the respective down-clocking ratios of N=4 and N=8, the number of STF samples remains the same, namely, 160. However, the number of repetitions with N=4 is 10 (times 16 samples) and with N=8 is five (times 32 samples). Alternatively, the respective L-STF field structure using a down-clocking ratio N=4 may be used since there will not be a day gradation and performance with a longer delay spread as is the case with status symbols.

With respect to the L-SIG and SIG A fields, three respective OFDM symbols are typically used. However, in accordance with the developing IEEE 802.11 af, which targets a new spectrum, the content of these respective symbols corresponding to these respective fields may be merged into a fewer number of symbols (e.g., two symbols). Furthermore, a design of the 128 FFT SIG field uses a DUP (duplicate) structure of the 64 FFT SIG field. However, since the basic channel unit is a subset of the available 6 MHz channel (e.g., 5 MHz), if a 128 FFT is used to span this bandwidth subset (e.g., the 5 MHz portion thereof) than there is no need for a DUP structure, and the information can use an entire one and only one OFDM symbol (with an added advantage of using all 54 information bits). That is to say, all such information may be included within a singular OFDM symbol that spans this bandwidth subset (e.g., the 5 MHz portion thereof).

As may be seen with respect to this particular diagram, savings may be made with respect to the STF field as well as with respect to the SIG field.

Figure 7:
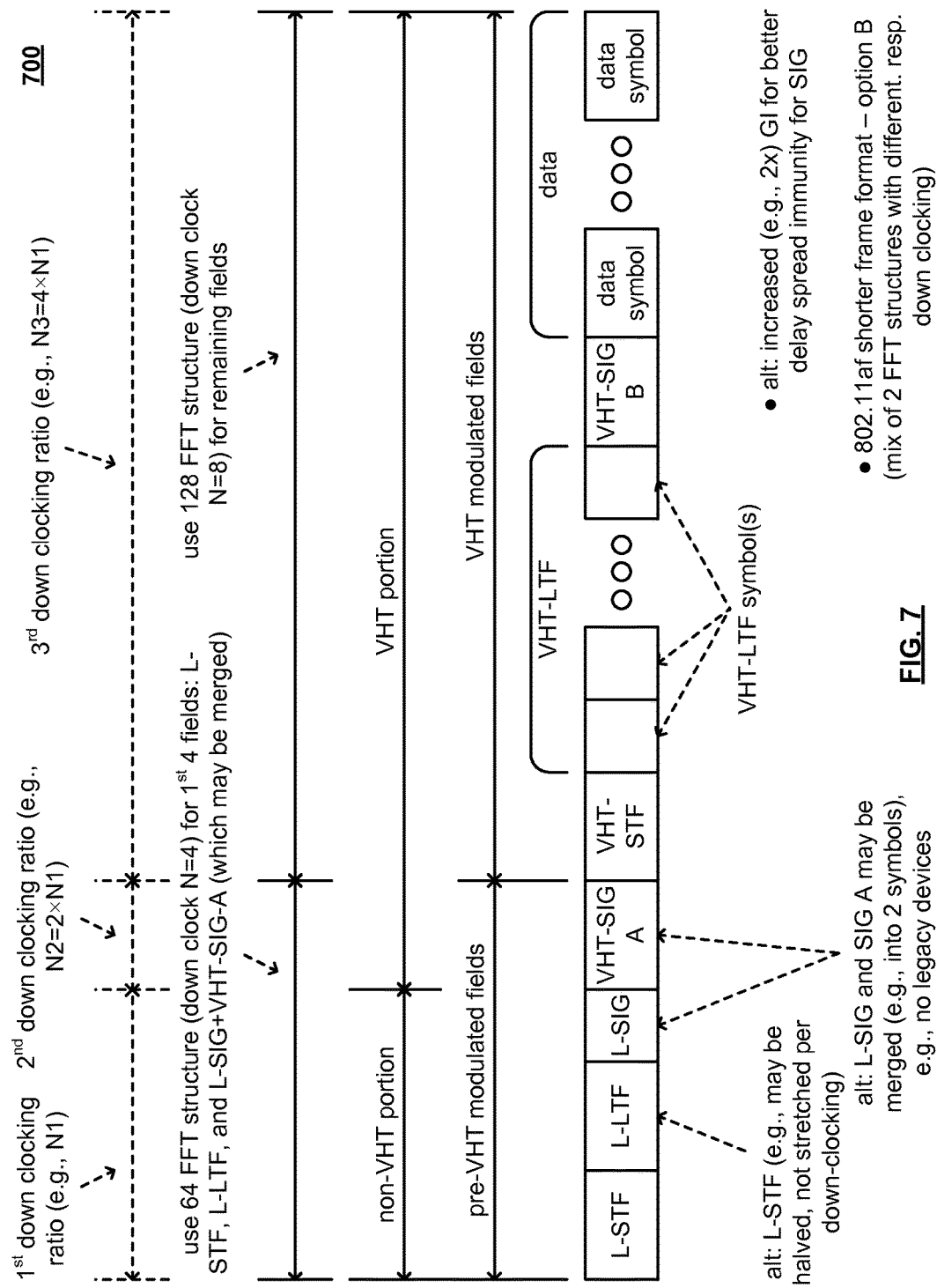
FIG. 7 illustrates an alternative embodiment of a shorter frame format option (e.g., frame format—option B).

FIG. 7 illustrates an alternative embodiment 700 of a shorter frame format option (e.g., frame format—option B). With respect to this diagram, the entire respective preamble fields (e.g., L-STF, L-LTF and L-SIG+VHT-SIG A) (also, while merging the two respective SIG fields into one field composed of two symbols), the 64 FFT structure associated with IEEE 802.11ac maybe down-clock by a factor of 4. Since the frequency spectrum associated with the developing IEEE 802.11 af is new, the content of the L-SIG and the VHT-SIG A fields may be merged into two respective symbols (e.g., considering implementations that do not include any legacy devices given that the developing IEEE 802.11 af is new).

In accordance with this diagram, packet generation may be made using a mixture of different respective FFT structures respectively down-clocked by different respective clock ratios. That is to say, considering one possible embodiment, packet generation may be effectuated using a mixture of 64 FFT down-clocked by a factor of 4 for the first four fields, followed by 128 FFT down-clocked by a factor of 8. In addition, if desired, in order to provide for better delay spread immunity for the SIG field, a double sized guard interval (GI) may be employed instead of the typical and regular GI.

Again, as with respect to the previous diagram, since the developing IEEE 802.11af is targeting a new portion of the frequency spectrum, the content of the respective symbols L-SIG and the VHT-SIG A fields may be merged into two respective symbols because there are no such legacy devices operative in accordance with this developing IEEE 802.11af.

Figure 8:
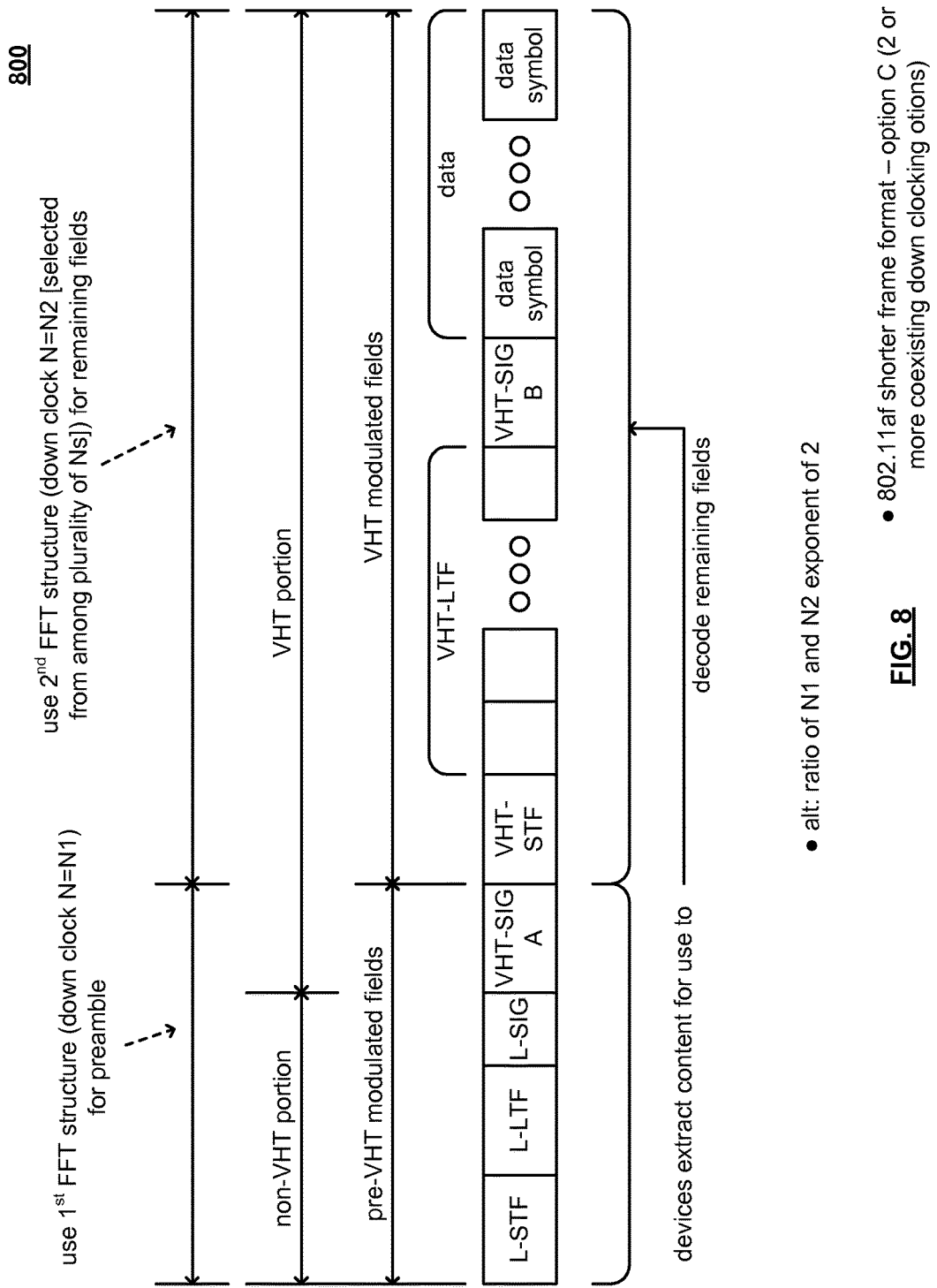
FIG. 8 illustrates yet another alternative embodiment of a shorter frame format option (e.g., frame format—option C).

FIG. 8 illustrates yet another alternative embodiment 800 of a shorter frame format option (e.g., frame format—option C). With respect to this diagram, two or more respective coexisting FFT structures respectively down-clocked by different respective clock ratios may be employed. As such, the respective down-clocking ratio may be programmable, adaptively determined, selectable, etc. such that there is no need to select or implement only one singular down-clocking ratio that is best suited for all possible implementations and scenarios. For example, by having a fixed portion of the preamble (e.g., the pre-VHT modulated fields) operating in accordance with a first down-clocking ratio (e.g., N=4, which may be selected for a relatively higher efficiency), and by having a remaining portion of the packet to use one of a number of possible down-clocking ratios, overall efficiency or delay spread immunity may be increased. Generally speaking, it is noted that the FFT structure and associated down-clocking ratio corresponding to different respective portions of a packet may be adaptive, selectable, programmable, etc. That is to say, different respective down-clocking ratios may be applied to different respective portions of the packet. In some embodiments, a fixed or predetermined down-clocking ratio is employed for one portion of the packet, while an adaptively determined, selected, etc. down-clocking ratio is employed for another portion of the packet. Generally speaking, multiple different respective down-clocking ratios may be selectively applied to different respective portions of the packet.

Also, it is noted that certain designs may operate to maintain the ratio between different respective and supported down-clocking ratios to be an exponent of the factor, 2, to facilitate less complexity in implementation. For example, in accordance with operating using different respective down-clocking ratios for different respective portions of the packet, implementations may be made such that all possible communication devices will always be able to hear, understand, process, etc. a particular portion of the packet, and based on the respective content decoded therein within that particular portion of the packet, one or more (or all) of the remaining portion of the packet may be decoded. For example, in one particular embodiment, the pre-VHT modulated fields may be appropriately handled such that all communication devices will always be able to hear, understand, process, etc. those particular fields of the packet. Based upon content decoded there from, one or more of the respective communication devices will be able to decode one or more (or all) of the remaining portion of the packet.

Certain efficiency comparison may be made with respect to employing the preamble length associated with different respective down-clocking ratios of N=4, 8, and 8 with option A, and N=8 with option B. For example, certain assumptions may be made with respect to such an efficiency comparison. For example, it may be assumed that in any case the two respective fields L-SIG and VHT-SIG A are merged into one respective field, that the field L-STF includes two symbols, that the field L-LTF includes two symbols, that the field VHT-STF includes one symbol, that the field VHT-LTF includes one symbol (for one spatial stream), and the field VHT-SIG B includes one symbol.

The respective preamble length with the down-clocking ratio of N=4 is 2+2+2+1+1+2=9 short symbols.

The respective preamble length with the down-clocking ratio of N=8 is double to the link provided above, or 18 short symbols.

The respective preamble length with the down-clocking ratio of N=8 and option A is 1+2+1+1+1+1=7 long symbols, or equivalently 14 short symbols (providing for a 22% savings).

The respective preamble length with the down-clocking ratio of N=8 and option B is 2+2+2 short 1+1+1 long=12 short symbols (providing for a 33% savings). As a reminder to the reader, the option B corresponds to a mixture of different respective down-clocking ratios applied to different respective portions of the packet.

Generally, observation may lead to the conclusion that by increasing down-clocking ratios and consequently increasing OFDM symbol time, that the SIFS and SLOT time should also increase correspondingly (e.g., such as in accordance with increasing linearly with down-clocking ratio). However, it may be understood that since the target channel bandwidth is the same (e.g., irrespective of the down-clocking ratio), these respective parameters related to MAC throughput may also be selected to be the same.

For example, with respect to SIFS, SIFS is currently 16 μs within IEEE 802.11g/n/ac and corresponds to the sum of receive and transmit turnaround time, MAC processing delay, and the total receive delay from the antenna. If it is considered to the basic IEEE 802.11af channel bandwidth is of a particular value X (e.g., 5 MHz), then irrespective of the down-clocking ratio, the SIFS should be 16/X×20 (=64 μs for 5 MHz), as the turnaround time and processing delay are a function of the device clock which in turn is a function of the system bandwidth. Also, running the receiver with a faster clock may be used to reduce the number to approximately 16/X×10 (=32 μs for 5 MHz).

With respect to clear channel assessment (CCA) time, CCA time is currently 4 MHz within IEEE 802.11g/n/ac is a function of the time it takes to detect a signal with 90% probability. With a bandwidth reduction to an IEEE 802.11af channel bandwidth is of a particular value X (e.g., 5 MHz), it may be expected that this corresponding time will increase to 4/X×20 (or 16 μs for 5 MHz).

With respect to SLOT, SLOT is comprised of CCA time, air propagation time (which can be increased from 1 μs to 3 μs to accommodate larger cells) sees, and MAC processing delay they can remain unchanged relative to IEEE 802.11 ac.

As such, a summary of improved efficiency is such that the following numbers are employed for a single user 2 milliseconds packets providing an example of the gain in data efficiency using previous methods for using a down-clocking ratio of N=8 as compared to N=4.

Figure 9:
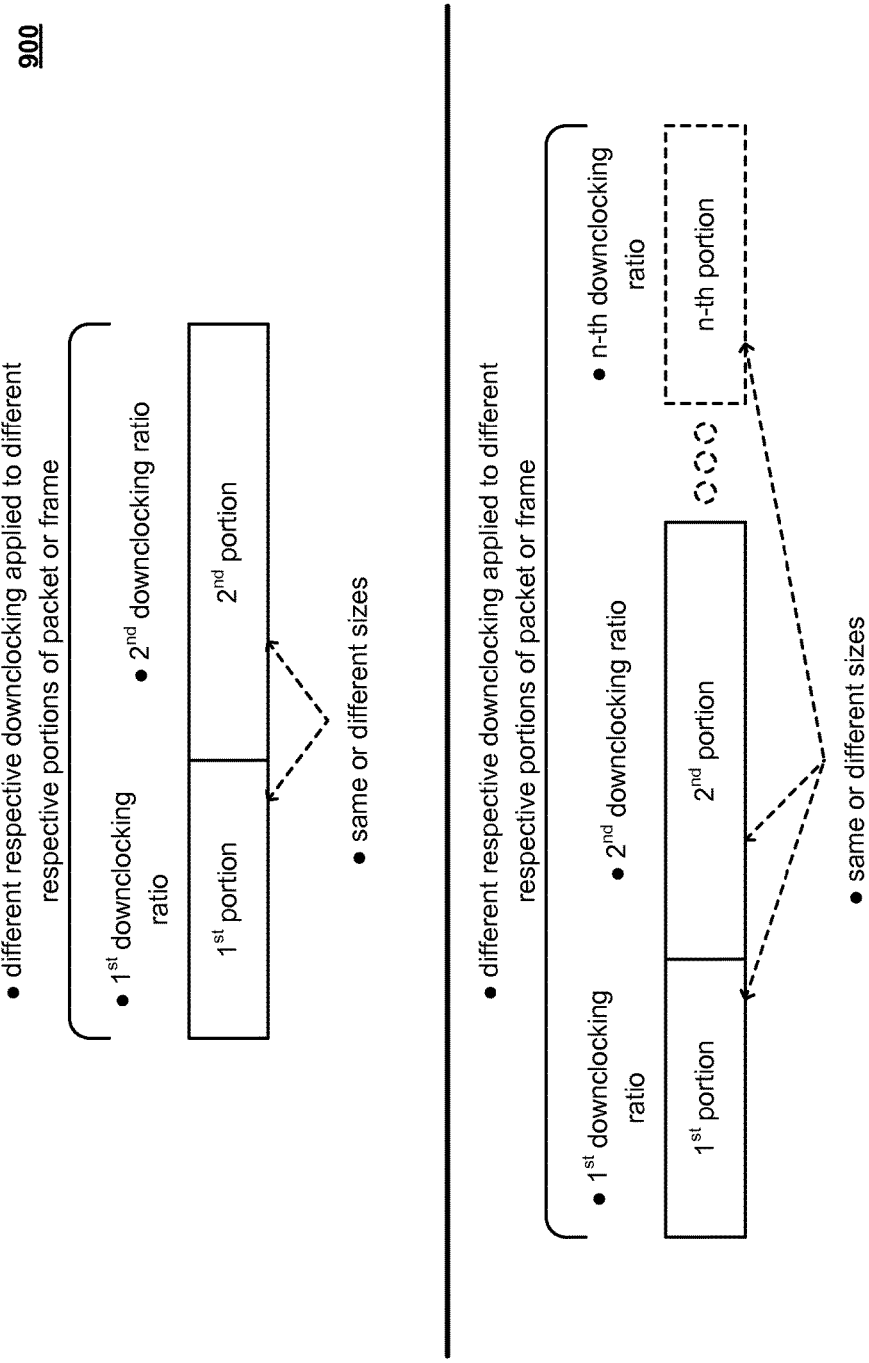
FIG. 9 illustrates an embodiment of a different respective downclocking ratios applied to different respective portions of a frame or packet.

1. N=4—78% data efficiency (meaning that 78% of the time is used for data in the remaining 22% is used for overhead including preamble, SIFS, etc.)
2. N=8—63.3%
3. N=8—68% which is achieved with a shorter SLOT and SIFS times based on the assumptions provided above and a previous embodiment
4. N=8—72% as in number 3 above and with option A
5. N=8—75% as in number 3 above and with option B FIG. 9 illustrates an embodiment 900 of a different respective downclocking ratios applied to different respective portions of a frame or packet. As may be understood, with respect to processing a given signal, different respective downclocking ratios may be applied to different respective portions thereof. For example, considering the top of the diagram, a packet or frame may be divided into two respective portions, and a first downclocking ratio may be applied to the first portion, and a second downclocking ratio may be applied to the second portion. Alternatively, considering the bottom of the diagram, a packet or frame may be divided generally into n respective portions (e.g., where n is an integer). A first downclocking ratio may be applied to the first portion, a second downclocking ratio may be applied to the second portion, and so on until an n-th downclocking ratio may be applied to the n-th portion. It is also noted that a given or same downclocking ratio may be applied to more than one of the respective portions in alternative embodiments (e.g., the first downclocking ratio may be applied to the first portion and a third).

Figure 10:
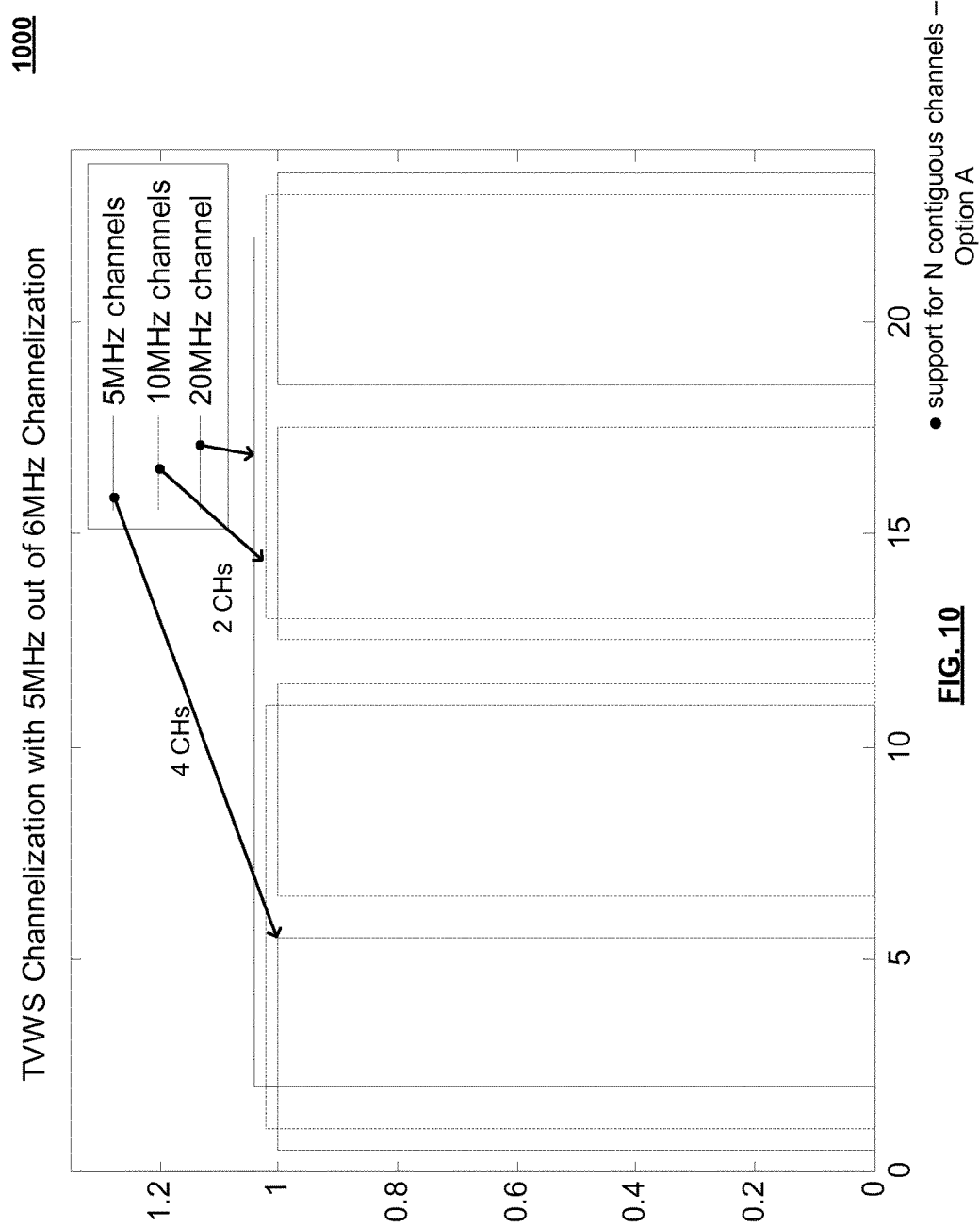
FIG. 10 illustrates an embodiment of an embodiment of support for a number of contiguous channels (e.g., contiguous channel support—option A).

FIG. 10 illustrates an embodiment of an embodiment 1000 of support for a number of contiguous channels (e.g., contiguous channel support—option A). It is noted that operation in accordance with IEEE 802.11ac supports operation of 20/40/80/160 MHz channels. Performing directed down-clocking of the IEEE 802.11ac waveform into the developing IEEE 802.11af channels may have certain coexistence issues if the down-clocking ratio employed doesn't fit particularly well into the respective channels used within the developing IEEE 802.11af channels, which may be composed of 6/12/24 MHz channels. For example, in accordance with meeting the relatively strict spectral mask requirements, there may be certain coexistence issues if the down-clocking ratio employed does not fit the respective developing IEEE 802.11 af channels. For example, there may be partially overlapping channels. Considering one possibility, if one channel occupies 5 MHz out of an available channel bandwidth of 6 MHz, then 2 respective channels would correspondingly occupy 10 MHz out of an available channel bandwidth of 12 MHz (e.g., two adjacent 6 MHz channels), and then 4 respective channels would correspondingly occupy 20 MHz out of an available channel bandwidth of 24 MHz (e.g., for adjacent 6 MHz channels).

As may be understood, a situation may be created where different respective basic services sets (BSSs) employing different respective bandwidths may partially overlap with respect to one another, and the respective communication devices therein may not be able to read the SIG field of different respective BSSs appropriately. That is to say, as may be seen with respect to this diagram, there may not be perfect alignment given the slight shifting with respect to the various channels, given that they are not perfectly overlapped one with respect to another. As such, all of the respective communication devices may not correspondingly be able to hear, process, etc. all respective communications because they are being provided on different respective bandwidths that may have, in some situations, only partial overlap.

As such, a pure receiver based implementation may be implemented such that a receiver operates to scan all respective frequency offsets in order to find the offset SIG field. That is to say, all respective frequency offsets are scanned in order to find the correct SIG field in the correct location. For example, considering certain assumptions as described above (e.g., 5/10/20 MHz channelization), the SIG field can be found in the middle of a 6 MHz channel, offset by ±500 kHz (e.g., due to 10 MHz channel), offset by ±1500 kHz (e.g., due to 20 MHz channel), and offset by ±1000 kHz (e.g., also due to 10 MHz channel in different location). If the signal bandwidth is different than 5 MHz, the corresponding offset will be different but no one a priori and the receiver can then calculate all of the possible offsets in order to correctly decode the SIG field.

Figure 11:
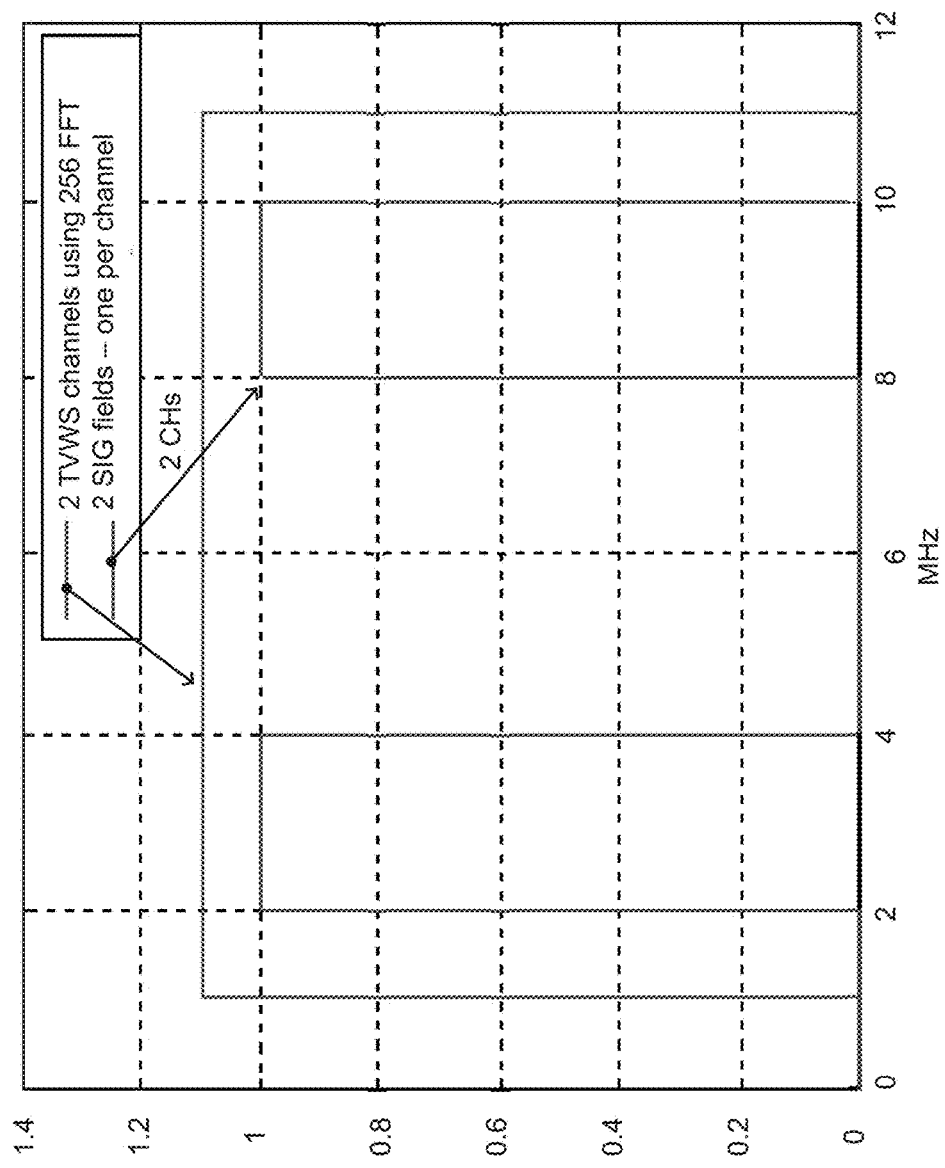
FIG. 11 illustrates an alternative embodiment of an embodiment of support for a number of contiguous channels (e.g., contiguous channel support—option B(1)).

FIG. 11 illustrates an alternative embodiment 1100 of an embodiment of support for a number of contiguous channels (e.g., contiguous channel support—option B(1)). With respect to this diagram, the SIG field may be changed such that it only occupies half of the bandwidth. In other words, using a 128 FFT with a down-clocking ratio N=8, then the SIG field structure may be changed from a DUP mode to only repeating once in the center of the packet. That is to say, there may be no need to perform the DUP mode, and the respective SIG field may be made more narrow but placed in the middle of the available bandwidth. For example, if using a 64 FFT with the down-clocking ratio N=4 (whereby the SIG field is not DUP'ed), then a down-clocking ratio N=8 may be employed for the SIG field in the LDS symbols preceding it with a down-clocking ratio N=8.

In addition, regardless of the bandwidth used, modification of the SIG location may be made such that it always lies in the center of the given TV channel, or as close as possible to the center of the TV channel within a given constraint. For example, this may be effectuated such that the constraint being that it sits on the OFDM tones which may not coincide with the center of each respective channel.

As may be understood with respect to this diagram in the following diagram, the SIG field may be modified to occupy a relatively more narrow bandwidth, yet such that it always falls in the center of the available channel bandwidth (or as close to possible to the center of the channel bandwidth). As such, even if data within a packet falls on one particular channel, then a receiver device will always be able to decode the SIG field in accordance with such placement of the SIG field in the center of an available bandwidth.

Figure 12:
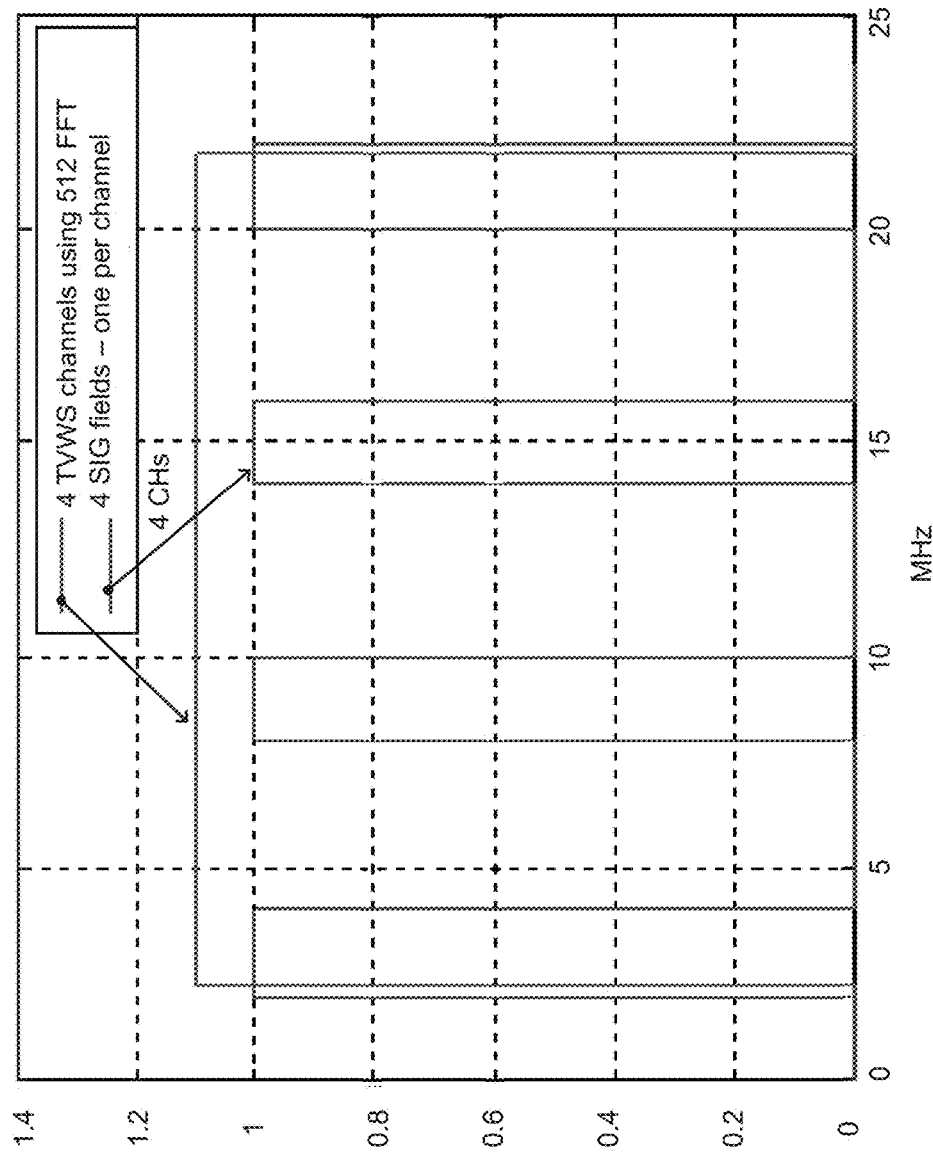
FIG. 12 illustrates yet another alternative embodiment of an embodiment of support for a number of contiguous channels (e.g., contiguous channel support—option B(2)).

FIG. 12 illustrates yet another alternative embodiment 1200 of an embodiment of support for a number of contiguous channels (e.g., contiguous channel support—option B(2)). This diagram depicts an alternative embodiment including multiple respective SIG field each respectively having more narrow bandwidth than the previous diagram.

In other words, a packet may be designed to start with the respective preamble fields (e.g., STF/LTF/SIG) that are located at the center of a channel regardless of the corresponding packet bandwidth. That is to say, regardless of a bandwidth associated with a given packet (which may be one of any of a number of possible packet bandwidth), the respective preamble fields will be located at the center of the bandwidth associated with that given channel. Such a receiver may employ a bandpass filter implemented therein to tune to the bandwidth of different respective and available channel bandwidths to improve receiver sensitivity. Also, a given receiver will understand, based on the SIG field, what the packet bandwidth of that particular packet is (e.g., one channel, to channels, for channels, etc.) and their particular location relative to the location of the SIG field. That is to say, based upon the location of the SIG field, the respective packet bandwidth may also be deduced there from (implicitly in certain embodiments based on the location of the SIG field). For example, considering an implementation of four respective channels of the SIG field, the SIG field will convey the information +1, +2, +3 or −1, +1, +2 or −2, −1, +1 or −3, −2, −1 on the location of the channels relative to the channel containing the SIG. In such an example, before respective channels are relative to the channel on which the SIG field is conveyed (thereby implicitly indicating the packet bandwidth).

Figure 13:
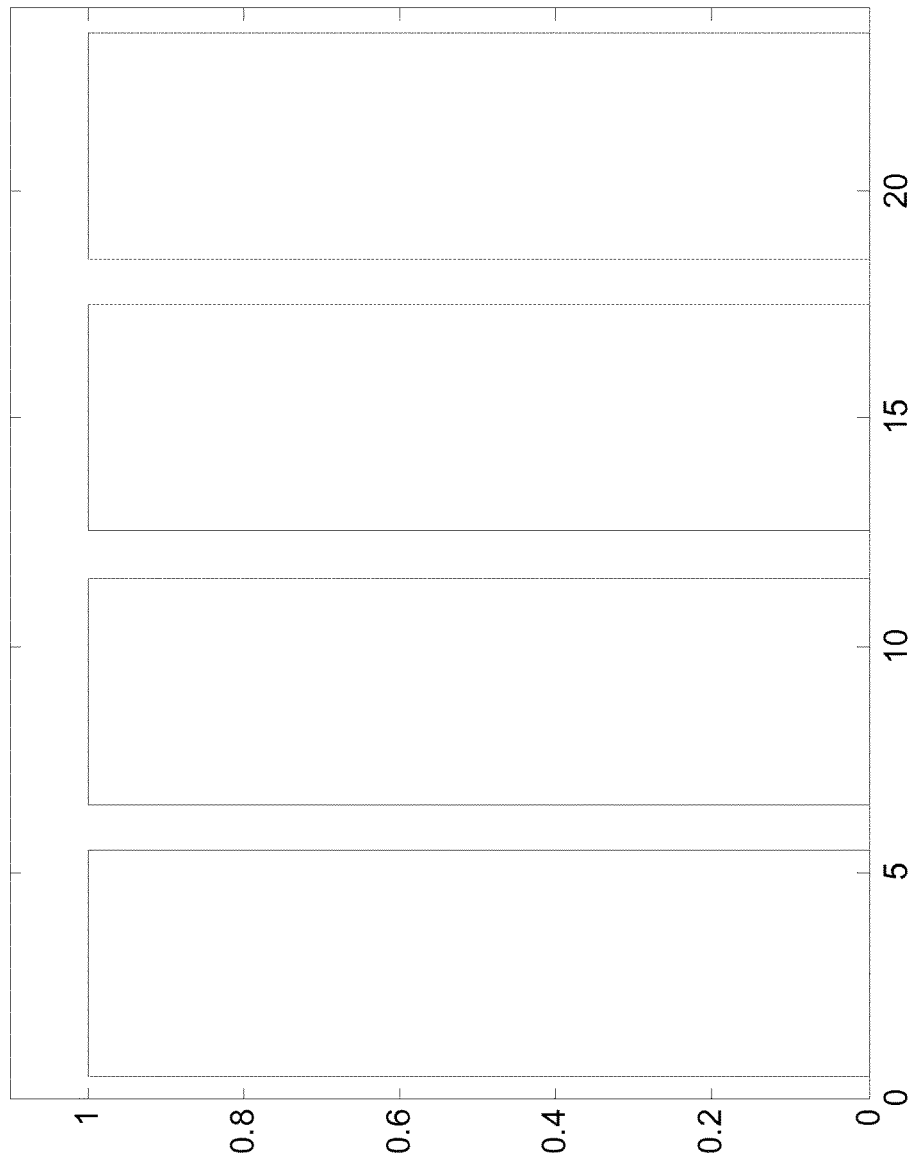
FIG. 13 illustrates yet an alternative embodiment of an embodiment of support for a number of contiguous channels (e.g., contiguous channel support—option C).

FIG. 13 illustrates yet an alternative embodiment 1300 of an embodiment of support for a number of contiguous channels (e.g., contiguous channel support—option C). With respect to this diagram, the respective channels may be generated separately. For example, a unit of one channel may be employed as the basis for sending two or more contiguous channels. Operation in accordance with this various allows for noncontiguous operation (e.g., two or more respective TVWS channels that are not necessarily adjacent one another, such that at least one other TVWS channel is intervening in between them). For example, there may be instances in which there is a fragmented spectrum availability (e.g., in urban areas), and it may make sense to design for two or more non-contiguous channels. Of course, it is noted that contiguous channel transmission may also be effectuated in other embodiments or in embodiments employing noncontiguous channels as well.

In such an implementation, each respective channel (out of the N contiguous channels) may be filtered separately and then frequency offset to be positioned in the middle of the TVWS channel avoiding the offset issues described above with respect to option A and avoiding a different SIG field structure as an option B.

It is also noted that different respective modulation coding sets (MCSs) may respectively be employed for different respective channels (e.g., such as when those respective channels are noncontiguous). That is to say, certain channels may have relatively more interference than others, different propagation effects, etc., and adaptation among those respective channels as a function of MCS can allow for the least possible degradation in service.

Figure 14:
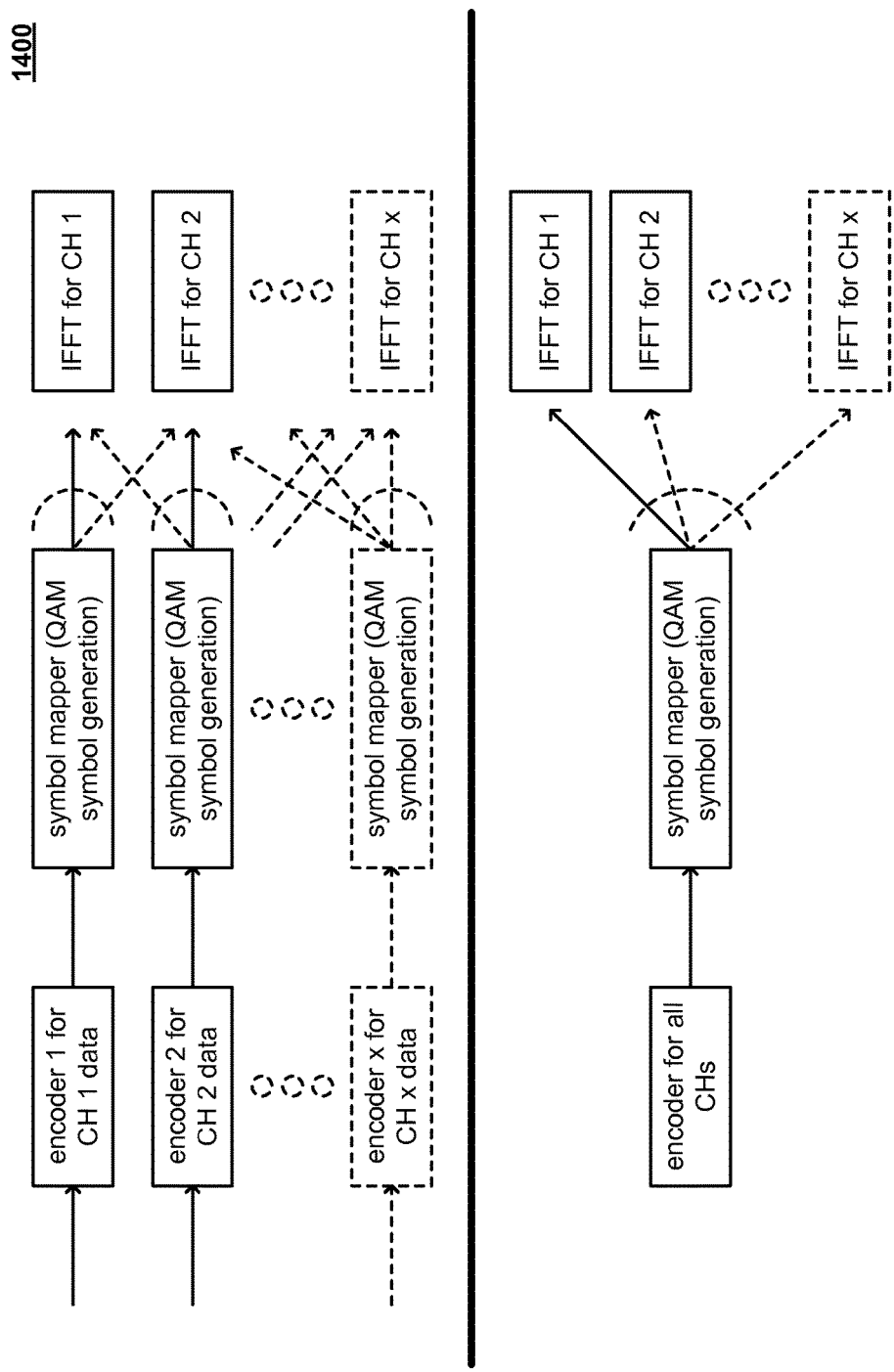
FIG. 14 illustrates an embodiment of packet generation to fit into a number of channels.

FIG. 14 illustrates an embodiment 1400 of packet generation to fit into a number of channels. There are a number of options for generating a packet to fit into a particular number of channels using one channel as a building block.

Option 1: Define two (or more) independent channels (contiguous or non-contiguous) that are not jointly encoded. They would then function as two independent channels with a common MAC but two or more independent encoders each generating the required information bits to fill its own channel. However, diversity may not be fully exploited in such an embodiment.

Option 2: Define per channel encoding allowing per channel MCS but also exploiting channel diversity. The PPDU encoding process is performed on a per-channel basis and all channels data is combined in the frequency mapping into tones. Mapping into tones is done such that each encoder output enjoys the diversity of all the available channels. A simple mapping into tones uses a round robin mapping whereby each encoder output is mapped into tones in all the channels (e.g. encoder one uses even tones on each channel and encoder 2 uses odd tones in each channel). The same round robin mapping can be used for 4 bonded channels whereby each encoder splits its output QAM symbols into each of the 4 channels.

Option 3: using the IEEE 802.11 ac definition of segment parser (a segment refers to an 80 MHz channel), since each channel needs to be filtered separately, the segment deparser used for contiguous 80+80 mode needs to be removed and the transmitter should follow the same structure as with non-contiguous 80+80.

Option 4: instead of splitting bits at the encoder output by using a segment parser, an alternative embodiment may operate to optimize diversity by first mapping bits into QAM symbols and then splitting the symbols in a round robin fashion between the channels. Again, the same round robin mapping can be used for any number of bonded channels (e.g., two or more clusters or channels combined such as in accordance with reference to FIG. 3).

However, the two previous options (Option 3 and 4) may be viewed as being somewhat limited as they both inherently assume the same MCS on each channel. In the developing IEEE 802.11af (which may be referred to as TGaf), unlike IEEE 802.11as (which may be referred to as TGac), channels may have considerably higher SNR difference and perhaps SINR difference due to TV channels interference— channels at VHF 200 MHz, UHF 500 MHz and 700 MHz will have different propagation and interference, considerably more than in the 5 GHz band. As such, it may be preferable to allow usage of different MCS for each channel (especially for non-contiguous operation) as described also above. As such, another option may be employed.

Option 5: similar to option 1 except that the interleaved encoded bits of the two or more channels are first mixed together based on the ratio of Nbpsc (number of coded bits per subcarrier 1, 2, 4, 6 or 8) in each channel. For example, if one channel uses 16 QAM (Nbpsc=4) and one channel uses 64QAM (Nbpsc=6), the new bit stream contains 4 bits from the encoder of channel 1, followed by 6 bits for the encoder of channel 2, etc.

With respect to signaling of the occupied bandwidth, unlike the IEEE 802.11ac standard, where channel location is uniquely defined (e.g., the first 80 MHz channel occupies the first four 20 MHz channels, the second 80 MHz channel occupies the second group of 4 20 MHz channels —in other words, there is no overlap between 40, 80, or 160 MHz channels), TVWS channel availability varies from location to location.

As such, when transmission on several contiguous channels occurs, signaling of which exact channels are utilized may be made as a device initially tuned to one channel can't assume it knows which channels are used. This is achieved by conveying the following information in the SIG field: Bandwidth—one channel, two channels, four channels, etc.

The exact location relative to the location of the SIG field (for example in case of four channels the SIG field will convey the information +1,+2,+3 or −1,+1,+2 or −2,−1,+1 or −3,−2−1 on the location of the channels relative to the channel containing the SIG). It is noted that if 4 channels are bonded, the SIG field on each channel will not have the exact same info since each channel has a different location relative to the 4 bonded channels.

Figure 15:
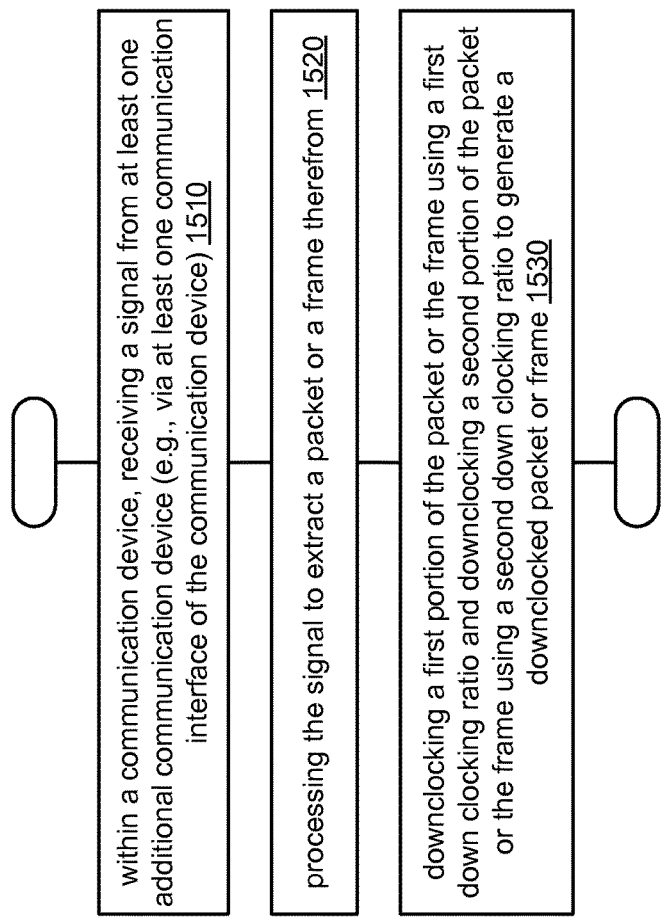
FIG. 15 and FIG. 16 are diagrams illustrating embodiments of methods for operating one or more wireless communication devices
Figure 16:
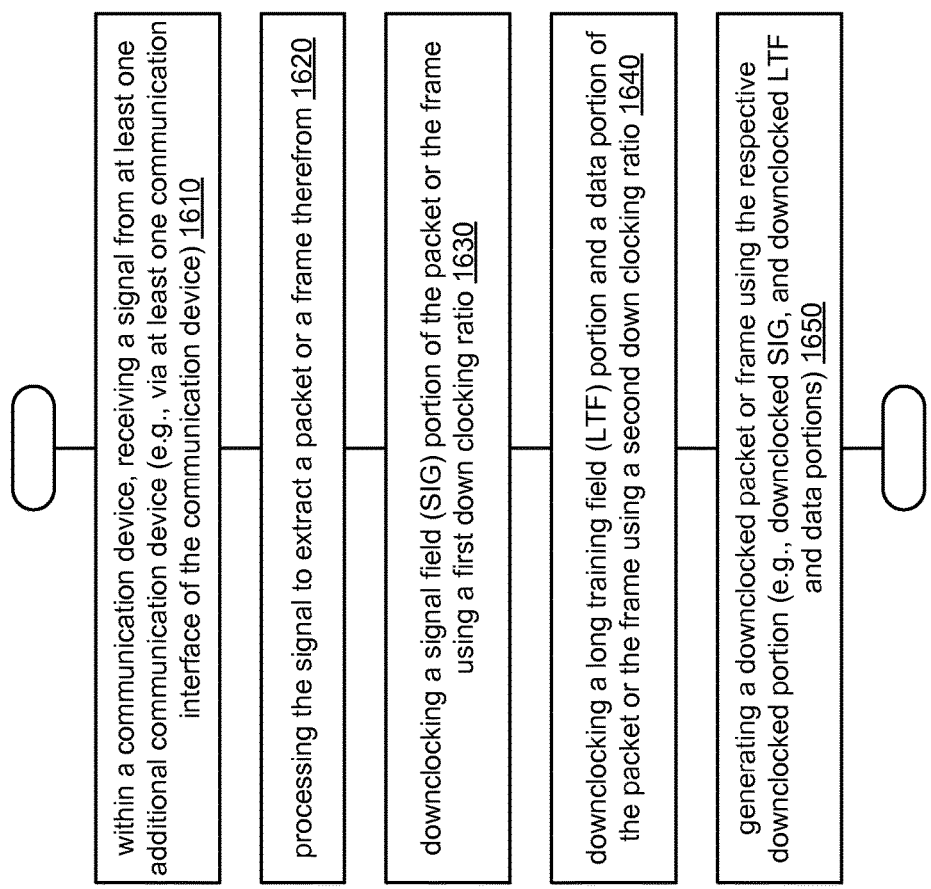

FIG. 15 and FIG. 16 are diagrams illustrating embodiments of methods for operating one or more wireless communication devices Referring to method 1500 of FIG. 15, within a communication device, the method 1500 begins by receiving a signal from at least one additional communication device (e.g., via at least one communication interface of the communication device), as shown in a block 1510. The method 1500 continues by processing the signal to extract a packet or a frame therefrom (e.g., such as via front-end processing, demodulation, pre-processing, etc.), as shown in a block 1520.

The method 1500 then operates by downclocking a first portion of the packet or the frame using a first down clocking ratio and downclocking a second portion of the packet or the frame using a second down clocking ratio to generate a downclocked packet or frame, as shown in a block 1530.

Referring to method 1600 of FIG. 16, within a communication device, the method 1600 begins by receiving a signal from at least one additional communication device (e.g., via at least one communication interface of the communication device), as shown in a block 1610. The method 1600 then operates by processing the signal to extract a packet or a frame therefrom (e.g., such as via front-end processing, demodulation, pre-processing, etc.), as shown in a block 1620.

The method 1600 then operates by downclocking a signal field (SIG) portion of the packet or the frame using a first down clocking ratio, as shown in a block 1630. The method 1600 continues by downclocking a long training field (LTF) portion and a data portion of the packet or the frame using a second down clocking ratio, as shown in a block 1640. The method 1600 then operates by generating a downclocked packet or frame using the respective downclocked portion (e.g., downclocked SIG, and downclocked LTF and data portions), as shown in a block 1650.

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein including one of more baseband processing modules, one or more media access control (MAC) layers, one or more physical layers (PHYs), and/or other components, etc. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction with software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:
1. A wireless communication device comprising:
a communication interface; and
processing circuitry that is coupled to the communication interface, wherein at least one of the communication interface or the processing circuitry configured to:
receive a signal from another wireless communication device via a communication channel having a channel bandwidth;
process a first at least one orthogonal frequency division multiplexing (OFDM) symbol of an OFDM packet of the signal based on a first clock signal;
downclock the first clock signal using a downclocking factor to generate a second clock signal;

process a second at least one OFDM symbol of the OFDM packet based on the second clock signal to extend OFDM symbol duration of the second at least one OFDM symbol of the OFDM packet;
downclock the first clock signal using another downclocking factor to generate a third clock signal; and
process a third at least one OFDM symbol of the OFDM packet based on the third clock signal to extend OFDM symbol duration of the third at least one OFDM symbol of the OFDM packet by a different symbol extension amount than the second at least one OFDM symbol of the OFDM packet.

2. The wireless communication device of claim 1, wherein the at least one of the communication interface or the processing circuitry is further configured to:
receive another signal from the another wireless communication device via the communication channel having the channel bandwidth;
process a fourth at least one OFDM symbol of another OFDM packet of the another signal based on the first clock signal;
downclock the first clock signal using at least one other downclocking factor to generate a fourth clock signal; and
process a fifth at least one OFDM symbol of the another OFDM packet based on the fourth clock signal to extend OFDM symbol duration of the fifth at least one OFDM symbol of the another OFDM packet.

3. The wireless communication device of claim 1, wherein:
the first OFDM symbol of the OFDM packet includes at least one signal field (SIG); and
the second OFDM symbol of the OFDM packet includes at least one data field.

4. The wireless communication device of claim 1, wherein the wireless communication device or the another wireless communication device includes a laptop host computer, a personal digital assistant host, a personal computer host or cellular telephone host.

5. The wireless communication device of claim 1, wherein:
the first at least one OFDM symbol of the OFDM packet includes at least one signal field (SIG);
the second at least one OFDM symbol of the OFDM packet includes at least one of at least one short training field (STF) or at least one long training field (LTF); and
the third at least one OFDM symbol of the OFDM packet includes at least one data field.

6. The wireless communication device of claim 1, wherein the at least one of the communication interface or the processing circuitry is further configured to:
receive the signal from the another wireless communication device via the communication channel having a 20 MHz channel bandwidth;
downclock the first clock signal using a first downclocking factor of 2 to generate the second clock signal;
process the second at least one OFDM symbol of the OFDM packet based on the second clock signal to extend the OFDM symbol duration of the second at least one OFDM symbol of the OFDM packet by 2;
downclock the first clock signal using a second downclocking factor of 4 to generate a fourth clock signal; and
process a fifth at least one OFDM symbol of the OFDM packet based on the fourth clock signal to extend OFDM symbol duration of the fifth at least one OFDM symbol of the OFDM packet by 4.

7. The wireless communication device of claim 1 further comprising:
an access point (AP), wherein the another wireless communication device includes a wireless station (STA).

8. The wireless communication device of claim 1 further comprising:
a wireless station (STA), wherein the another wireless communication device includes an access point (AP).

9. A wireless communication device comprising:
a communication interface; and
processing circuitry that is coupled to the communication interface, wherein at least one of the communication interface or the processing circuitry configured to:
receive a signal from another wireless communication device via a communication channel having a 20 MHz channel bandwidth;
process a first at least one orthogonal frequency division multiplexing (OFDM) symbol of an OFDM packet of the signal based on a first clock signal;
downclock the first clock signal using a first downclocking factor of 2 to generate a second clock signal;
process a second at least one OFDM symbol of the OFDM packet based on the second clock signal to extend OFDM symbol duration of the second at least one OFDM symbol of the OFDM packet by 2;
downclock the first clock signal using a second downclocking factor of 4 to generate a third clock signal; and
process a third at least one OFDM symbol of the OFDM packet based on the third clock signal to extend OFDM symbol duration of the third at least one OFDM symbol of the OFDM packet by 4.

10. The wireless communication device of claim 9, wherein:
the first OFDM symbol of the OFDM packet includes at least one signal field (SIG);
the second OFDM symbol of the OFDM packet includes at least one of at least one short training field (STF) or at least one long training field (LTF); and
the third OFDM symbol of the OFDM packet includes at least one data field.

11. The wireless communication device of claim 9, wherein the at least one of the communication interface or the processing circuitry is further configured to:
receive another signal from the another wireless communication device via the communication channel having the 20 MHz channel bandwidth;
process a third at least one OFDM symbol of another OFDM packet of the another signal based on the first clock signal;
process a fourth at least one OFDM symbol of the another OFDM packet based on the second clock signal to extend OFDM symbol duration of the second at least one OFDM symbol of the OFDM packet by 2;
process a fifth at least one OFDM symbol of the another OFDM packet based on the third clock signal to extend OFDM symbol duration of the second at least one OFDM symbol of the OFDM packet by 4; and
process a sixth at least one OFDM symbol of the another OFDM packet based on the third clock signal to extend OFDM symbol duration of the second at least one OFDM symbol of the OFDM packet by 4.

12. The wireless communication device of claim 9 further comprising:
an access point (AP), wherein the another wireless communication device includes a wireless station (STA).

13. The wireless communication device of claim 9 further comprising:
a wireless station (STA), wherein the another wireless communication device includes an access point (AP).

14. A method for execution by a wireless communication device, the method comprising:
receiving, via a communication interface of the wireless communication device, a signal from another wireless communication device via a communication channel having a channel bandwidth;
processing a first at least one orthogonal frequency division multiplexing (OFDM) symbol of an OFDM packet of the signal based on a first clock signal;
downclocking the first clock signal using a downclocking factor to generate a second clock signal; and
processing a second at least one OFDM symbol of the OFDM packet based on the second clock signal to extend OFDM symbol duration of the second at least one OFDM symbol of the OFDM packet;
receiving, via the communication interface of the wireless communication device, another signal from the another wireless communication device via the communication channel having the channel bandwidth;
processing a third at least one OFDM symbol of another OFDM packet of the another signal based on the first clock signal;
downclocking the first clock signal using another downclocking factor to generate a third clock signal; and
processing a fourth at least one OFDM symbol of the another OFDM packet based on the third clock signal to extend OFDM symbol duration of the fourth at least one OFDM symbol of the another OFDM packet.

15. The method of claim 14, wherein:
the first OFDM symbol of the OFDM packet includes at least one signal field (SIG); and
the second OFDM symbol of the OFDM packet includes at least one data field.

16. The method of claim 14 further comprising:
downclocking the first clock signal using at least one other downclocking factor to generate a fourth clock signal; and
processing a fifth at least one OFDM symbol of the OFDM packet based on the fourth clock signal to extend OFDM symbol duration of the fifth at least one OFDM symbol of the OFDM packet by a different symbol extension amount than the second at least one OFDM symbol of the OFDM packet.

17. The method of claim 16, wherein:
the first at least one OFDM symbol of the OFDM packet includes at least one signal field (SIG);
the second at least one OFDM symbol of the OFDM packet includes at least one of at least one short training field (STF) or at least one long training field (LTF); and
the third at least one OFDM symbol of the OFDM packet includes at least one data field.

18. The method of claim 14 further comprising:
receiving, via the communication interface of the wireless communication device, the signal from the another wireless communication device via the communication channel having a 20 MHz channel bandwidth;
downclocking the first clock signal using a first downclocking factor of 2 to generate the second clock signal;
processing the second at least one OFDM symbol of the OFDM packet based on the second clock signal to extend the OFDM symbol duration of the second at least one OFDM symbol of the OFDM packet by 2;
downclocking the first clock signal using a second downclocking factor of 4 to generate a fourth clock signal; and
processing a fifth at least one OFDM symbol of the OFDM packet based on the fourth clock signal to extend OFDM symbol duration of the fifth at least one OFDM symbol of the OFDM packet by 4.

19. The method of claim 14, wherein the wireless communication device includes a wireless station (STA), and the another wireless communication device includes an access point (AP).

20. A wireless communication device comprising:
a communication interface; and
processing circuitry that is coupled to the communication interface, wherein at least one of the communication interface or the processing circuitry configured to:
receive a signal from another wireless communication device via a communication channel having a 20 MHz channel bandwidth;
process a first at least one orthogonal frequency division multiplexing (OFDM) symbol of an OFDM packet of the signal based on a first clock signal;
downclock the first clock signal using a downclocking factor of 2 to generate a second clock signal;
process a second at least one OFDM symbol of the OFDM packet based on the second clock signal to extend OFDM symbol duration of the second at least one OFDM symbol of the OFDM packet by 2;
downclock the first clock signal using a second downclocking factor of 4 to generate a third clock signal; and
process a third at least one OFDM symbol of the OFDM packet based on the third clock signal to extend OFDM symbol duration of the third at least one OFDM symbol of the OFDM packet by 4.

* * * * *